(12) United States Patent
Long et al.

(10) Patent No.: US 12,091,167 B1
(45) Date of Patent: Sep. 17, 2024

(54) SCISSORING MECHANISMS DEPLOYING AT LOW SPEED

(71) Applicant: Wisk Aero LLC, Mountain View, CA (US)

(72) Inventors: Geoffrey Alan Long, Montara, CA (US); Chase Nichols, Mountain View, CA (US); Patrick Kelly, Mountain View, CA (US)

(73) Assignee: Wisk Aero LLC, Mountain View, CA (US)

( * ) Notice: Subject to any disclaimer, the term of this patent is extended or adjusted under 35 U.S.C. 154(b) by 0 days.

(21) Appl. No.: 17/948,135

(22) Filed: Sep. 19, 2022

Related U.S. Application Data

(60) Provisional application No. 63/279,613, filed on Nov. 15, 2021, provisional application No. 63/245,788, filed on Sep. 17, 2021.

(51) Int. Cl.
*B64C 27/54* (2006.01)
*B64C 11/48* (2006.01)
*B64C 27/50* (2006.01)
*B64D 35/00* (2006.01)

(52) U.S. Cl.
CPC .............. *B64C 27/54* (2013.01); *B64C 11/48* (2013.01); *B64C 27/50* (2013.01); *B64D 35/00* (2013.01)

(58) Field of Classification Search
None
See application file for complete search history.

(56) References Cited

U.S. PATENT DOCUMENTS

| | | | |
|---|---|---|---|
| 10,494,088 B1 * | 12/2019 | Coralic | B64C 27/10 |
| 2019/0092461 A1 * | 3/2019 | Duffy | B64C 11/28 |
| 2022/0048616 A1 * | 2/2022 | Jung | B64C 11/28 |
| 2022/0111956 A1 * | 4/2022 | Jordan | B64C 27/473 |

* cited by examiner

*Primary Examiner* — Juan G Flores
(74) *Attorney, Agent, or Firm* — Kilpatrick Townsend & Stockton LLP

(57) ABSTRACT

Embodiments provide scissoring mechanisms for a vertical lift fan of an electric aircraft (e.g., a vertical take-off-landing eVTOL aircraft) where the blades of the vertical lift fan can be opened at almost zero speed. Exemplary scissoring mechanisms have position locking features that keep the collapsed blades in the low drag orientation once closed (e.g., in the stowed position). As a result, the scissoring mechanisms do not cause large impulses during opening and closing that cause large stresses and noise. In addition, the scissoring mechanisms provide an opportunity to check that the fans are opened properly prior to spinning them to the full operating speed. The scissoring mechanisms may not require an extra actuator, and rely on the propulsion motor.

20 Claims, 18 Drawing Sheets

SCISSORING MECHANISMS DEPLOYING AT LOW SPEED

CROSS-REFERENCES TO OTHER APPLICATIONS

This application claims benefit under 35 USC § 119(e) to U.S. Provisional Patent Application No. 63/245,788 filed Sep. 17, 2021 and entitled "Scissoring Mechanisms Deploying At Low Speed", and U.S. Provisional Patent Application No. 63/279,613 filed Nov. 15, 2021 and entitled "Scissoring Mechanisms Deploying At Low Speed", the disclosures of which are incorporated by reference herein in their entirety for all purposes.

BACKGROUND

Lift fans (e.g., for vertical flight) in an electric aircraft (e.g., a vertical take-off-landing eVTOL aircraft) have deployed and stowed configurations. The lift fans are in the deployed configuration during vertical flight to provide lift to the electric aircraft. The lift fans are in the stowed configuration during a forward flight of the electric aircraft to reduce drag. A scissoring mechanism for the lift fans (e.g., four-bladed fans) allow the fans to move between the deployed configuration where the fans are about 90 degrees apart, and the stowed (e.g., collapsed) configuration where the fans are on top of each other, aligned for a low drag configuration in forward flight. There may be one motor that drives both sets of blades. The scissoring mechanism allows that one motor to apply both positive and negative torque to both sets of blades without them collapsing. Existing scissoring mechanisms deploy at high speeds (e.g., speeds above 1000 rpm) and require a torque (e.g., an impact event) to be applied to the blades. Both of these requirements have negative impacts on an aircraft in flight.

Embodiments address these and other problems, individually or collectively.

SUMMARY

Embodiments provide scissoring mechanisms for an electric aircraft (e.g., a vertical take-off-landing eVTOL aircraft) where the blades of the fan can be opened at almost zero speed. Exemplary scissoring mechanisms have position locking features that keep the collapsed blades in the low drag orientation once closed (e.g., in the stowed position). As a result, the scissoring mechanisms do not cause large impulses during opening and closing that cause large stresses and noise. In addition, the scissoring mechanisms provide an opportunity to check that the fans are opened properly prior to spinning them to the full operating speed. According to various embodiments, the scissoring mechanisms do not require an extra actuator, and rely on the propulsion motor.

Some embodiments provide a system comprising a motor, a driven blade coupled to a driven rotor rotating around a first shaft coupled to the motor, a following blade coupled to a following rotor rotating around a second shaft concentric with the first shaft, and a scissoring mechanism configured to move the following blade and the driven blade between a stowed configuration and a deployed configuration. The scissoring mechanism comprises a positioning mechanism and a latch mechanism. The positioning mechanism is configured to keep the following blade and the driven blade in the stowed configuration. Disengaging the positioning mechanism moves the driven blade to a predetermined angle with respect to the following blade in the deployed configuration while the motor is operating at zero or near-zero speed. The latch mechanism is configured to keep the following blade and the driven blade in the deployed configuration. Engaging the latch mechanism locks the following blade at the predetermined angle with respect to the driven blade in the deployed configuration allowing the following blade and the driven blade to rotate together.

According to various embodiments, the system comprises a lift fan including the motor, the driven blade, the following blade, and the scissoring mechanism. Embodiments may further provide an aircraft comprising one or more of lift fans each including the above-described system.

In some embodiments, the scissoring mechanism further comprises a latch ring that is fixed to the second shaft, a following ring that is fixed to the following rotor, and a driven ring fixed to the first shaft. The latch ring, the driven ring and the following ring are stacked around the second shaft. The positioning mechanism includes a driven pawl coupled to the driven ring and a following detent formed on the following ring. The driven pawl is released from a closed configuration when the motor starts operating at near-zero speed and engages the following detent. The latch mechanism includes a following pawl provided on the following ring, and a driven detent formed on the driven ring. In the deployed configuration, at least a portion of the following pawl is caught in the driven detent.

In some embodiments, the positioning mechanism includes a first arm and a second arm coupled to each other via a pair of scissoring links and a pair of springs. The first arm is coupled to the second shaft and the second arm is coupled to the first shaft. In the stowed configuration, the pair of springs keep the pair of scissoring links in a closed configuration. In the deployed configuration, the pair of springs keep the pair of scissoring links in an open and extended configuration. The latch mechanism includes a pawl provided on at least one of the first arm or the second arm, and a detent. In the stowed configuration, a portion of the pawl is caught in the detent.

In some embodiments, the positioning mechanism includes a disengageable coupler having a fixed portion coupled to the first shaft and a sliding portion coupled to the second shaft, a solenoid configured to disengage and engage the sliding portion with the fixed portion, and a spring configured to re-engage the sliding portion and the fixed portion. The latch mechanism is incorporated in the positioning mechanism through the solenoid. While moving the following blade and the driven blade from the stowed configuration to the deployed configuration, the solenoid disengages the sliding portion from the fixed portion when the solenoid is energized allowing the driven blade to move with respect to the following blade, and engages the sliding portion from the fixed portion when the solenoid is deenergized allowing the driven blade to remain at a predetermined angle with respect to the following blade.

In some embodiments, the first shaft includes a vertical cam channel, the second shaft includes a profiled cam channel forming a set of nested channels with the vertical cam channel, the positioning mechanism includes: a pushrod provided within the first shaft, a cam follower coupled to the pushrod, and adapted to move in the set of nested channels, a set of masses coupled to an end of the pushrod. When a speed of the motor reaches a threshold speed, the set of masses move out radially and force the pushrod to travel within the set of nested channels, forcing the first shaft and the second shaft to travel from a stowed position and a deployed position. The latch mechanism includes the set of masses that keeps the following blade and the driven blade in the deployed configuration.

In some embodiments, positioning mechanism includes: a harmonic drive coupling the first shaft and the second shaft, the harmonic drive comprising: a circular spline coupled to the second shaft; a flex spline nested in the circular spline and coupled to the first shaft; and a wave generator nested in the flex spline and provided around a third shaft that rotates and drives the wave generator within the flex spline. A rotation of the wave generator generates a relative angular movement between the circular spline and the flex spline.

Various embodiments provide a lift fan comprising: a motor, a driven blade coupled to a driven rotor rotating around a first shaft coupled to the motor, a following blade coupled to a following rotor rotating around a second shaft concentric with the first shaft, and a scissoring mechanism comprising a positioning mechanism and a latch mechanism. The scissoring mechanism is configured to move the following blade and the driven blade between a stowed configuration and a deployed configuration. The following blade and the driven blade are stacked on top each other in a low drag position in the stowed configuration. The driven blade is at a predetermined angle to the following blade in the deployed configuration. The positioning mechanism is configured to keep the following blade and the driven blade in the stowed configuration. Disengaging the positioning mechanism moves the driven blade to a predetermined angle with respect to the following blade in the deployed configuration while the motor is operating at about 5 rpm or less. The latch mechanism is configured to keep the following blade and the driven blade in the deployed configuration. Engaging the latch mechanism locks the following blade at the predetermined angle with respect to the driven blade in the deployed configuration allowing the following blade and the driven blade to rotate together.

Embodiments may further provide an aircraft comprising one or more of lift fans as described above.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1A:
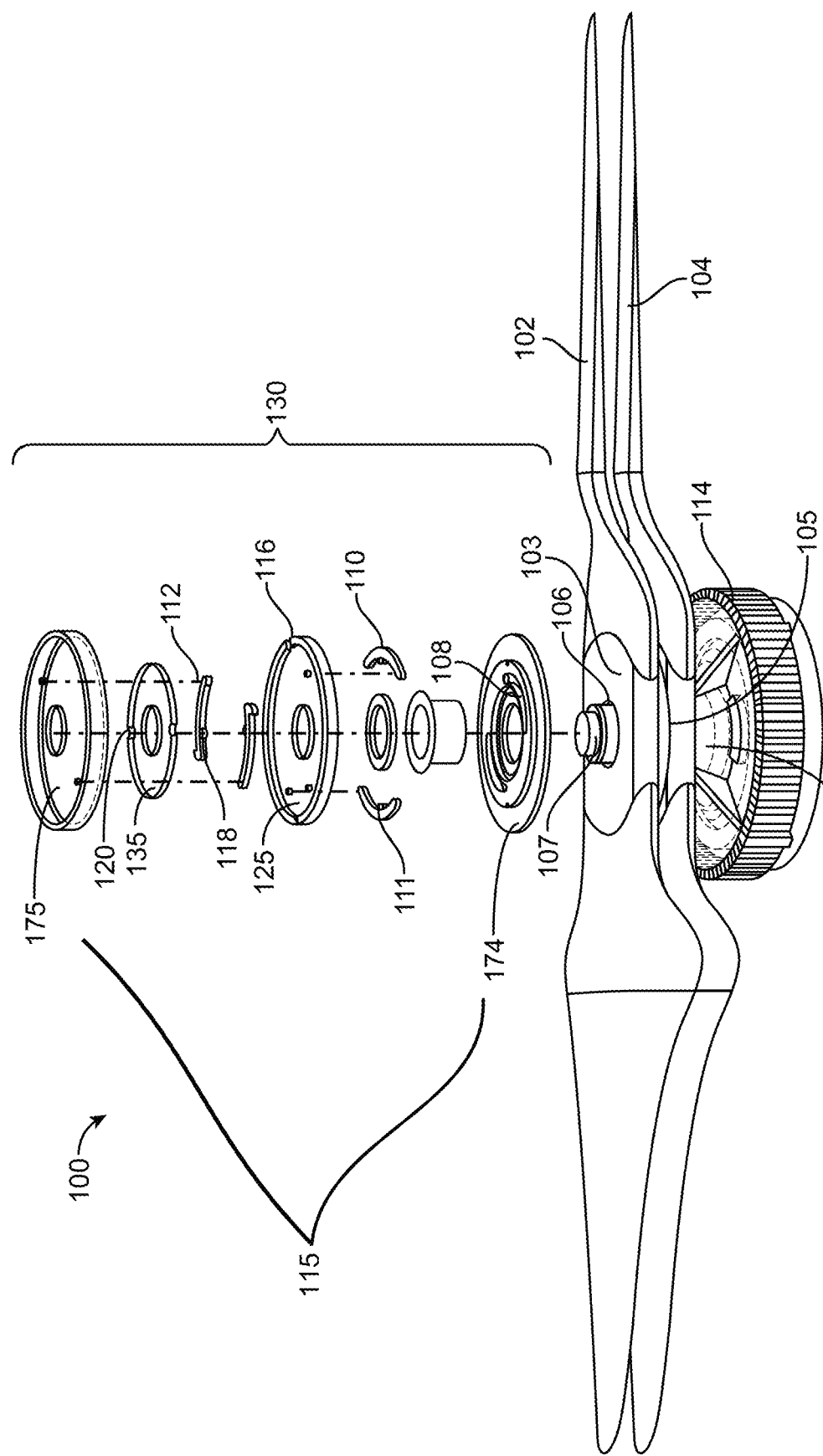
FIG. 1A illustrates components of a lift fan of an aircraft including an exemplary scissoring mechanism, according to various embodiments.

Techniques disclosed herein relate generally to an electrically powered aircraft including a plurality of lift fans. For example, the aircraft may include an electric vertical takeoff landing (eVTOL) aircraft that includes one or more horizontal fans or propellers for forward flight. More specifically, techniques disclosed herein provide a scissoring mechanism for the lift fans that deploy and stow the blades of the lift fans at low speed so that the impact events on the lift fans (or the remaining portions of the aircraft) are minimized or essentially eliminated. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Embodiments provide a scissoring mechanism for a lift fan. An exemplary lift fan may include a motor, a following blade (e.g., including a set of blades) coupled to a following rotor rotating around a first shaft coupled to the motor, a driven blade (e.g., including a set of blades) coupled to a driven rotor rotating about a second shaft concentric with the first shaft, and a scissoring mechanism configured to move the following blade and the driven blade between a stowed configuration and a deployed configuration. The scissoring mechanism may include (1) a positioning mechanism to keep the following blade and the driven blade in the stowed configuration, wherein disengaging the positioning mechanism moves the driven blade to a predetermined angle with respect to the following blade in the deployed configuration while the motor is operating at near-zero speed (e.g., about less than 5 rpm, or not to exceed 5 rpm); and (2) a latch mechanism to keep the following blade and the driven blade in the deployed configuration, wherein engaging the latch mechanism locks the following blade at the predetermined angle with respect to the driven blade in the deployed configuration allowing the following blade and the driven blade to rotate together. As described in greater detail below, according to various embodiments, during deploy, the following blade do not move, the driven blade is rotated to the predetermined angle (e.g., 90 degrees) to the deployed configuration. For example, the driven blade may move in a first direction (e.g., clockwise or counter-clockwise) by the predetermined angle. The predetermined angle may be 90 degrees, or any other angle that will result in the lift fan providing the desired lift to the aircraft.

FIGS. 1A-1E illustrate components of an exemplary lift fan of an aircraft including a scissoring mechanism, according to various embodiments. For example, the aircraft may include an eVTOL aircraft.

Referring now to FIG. 1A, the lift fan 100 includes a plurality of rotor blades (e.g., a driven blade 104 and a following blade 102) on concentric shafts (e.g., a motor shaft 106 coupled to the motor 114, and a latch post 107 that is fixed at a base of the lift fan 100). In some embodiments, each of the rotor blades can be individual structures that are coupled together at the hub 180 (e.g., the rotor includes 4 individual blades coupled to the hub 180). In other embodiments, two rotor blades may be structurally integrated into one elongated rotor blade (e.g., a driven blade 104 and a following blade 102 as shown in FIG. 1A) that extends through the hub 180 from two sides. For example, the first rotor blade and the third rotor blade may be integrated into a single structure forming the following blade 102, so that they are two sides of a single structure. Similarly, the second rotor blade and the fourth rotor blade may be integrated into another single structure forming the driven blade 104. In that case, the two individual structures (e.g., the following blade 102, the driven blade 104) can be coupled together at the hub 180. Each of the following blade 102 and the driven blade 104 may include at least two blades extending in opposite directions with respect to the hub 180 (e.g., two halves of the following blade 102, and two halves of the driven blade 104 as shown in FIG. 1A).

A scissoring mechanism 130 is coupled to the following blade 102. The scissoring mechanism 130 includes a following ring 115 (that is fixed to a following rotor 103), a driven ring 125 (that is fixed to the motor shaft 106) and a latch ring 135 (that is fixed to the latch post 107). According to various embodiments, the latch ring 135 may have a smaller diameter than diameters of the following ring 115 and/or the driven ring 125. A following ring 115 may also include a bottom ring 174 and a top ring 175 that form an enclosure in an assembled state of the scissoring mechanism 130 (as shown in FIG. 1). The driven ring 125 and the latch ring 135 may be sandwiched between the bottom ring 174 at the bottom and the top ring 175 at the top. The scissoring mechanism 130 further includes a first set of pawls 110 (e.g., driven pawls) each having a roller 111. The first set of pawls 110 are attached to a bottom surface of the driven ring 125. The rollers 111 are configured to engage following detents 108 formed on the bottom ring 174 of the following ring 115. The first set of pawls 110 function as a positioning mechanism to keep the following blade 102 and the driven blade 104 in the stowed configuration. Disengaging the positioning mechanism (e.g., first set of pawls 110) moves the driven blade 104 to a predetermined angle with respect to the following blade 102 in the deployed configuration while the motor is operating at near-zero speed (e.g., about less than 5 rpm, or not to exceed 5 rpm).

The scissoring mechanism 130 also includes a second set of pawls 112 (e.g., following pawls) each having a roller 118 and a pallet 150 (shown in FIG. 1B) attached to the top ring 175 of following ring 115. The rollers 118 are configured to engage latch detents 120 formed on the latch ring 135, the pallets 150 are configured to engage the driven detents 116 on the driven ring 125. The second set of pawls 112 function as a latch mechanism to keep the following blade 102 and the driven blade 104 in the deployed configuration. Engaging the latch mechanism (e.g., second set of pawls 112) locks the following blade 102 at the predetermined angle with respect to the driven blade 104 in the deployed configuration, allowing the following blade 102 and the driven blade 104 to rotate together.

The pawls, detents, pallet, and stops define the relationship between the rings 115, 125, 135 as the scissoring mechanism 130 cycles between the stowed and deployed configurations. According to some embodiments, magnets may be coupled to the pawls to provide sufficient latching torque.

Figure 1B:
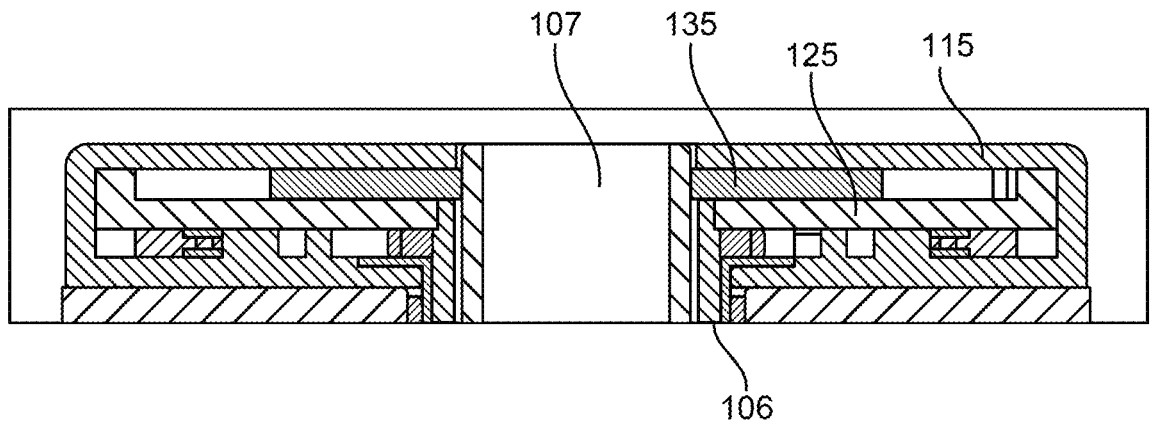
FIG. 1B illustrates a cut-out view of the scissoring mechanism in the stowed configuration of the driven blade and the following blade, according to various embodiments.
Figure 1C:
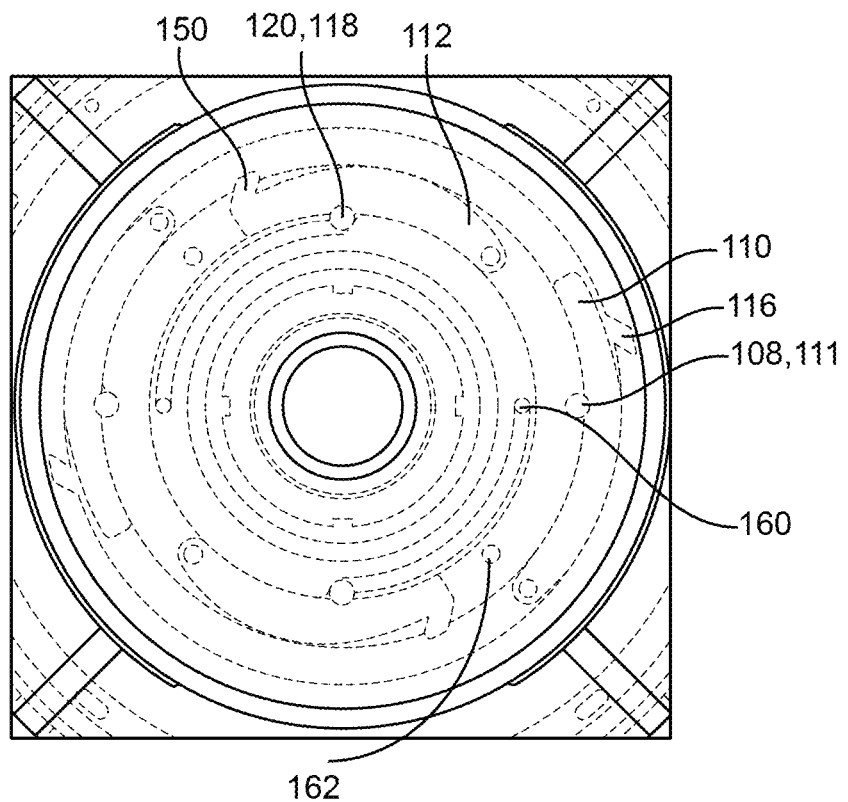
FIG. 1C illustrates a top view of the scissoring mechanism in the stowed configuration of the driven blade and the following blade, according to various embodiments.
Figure 1D:
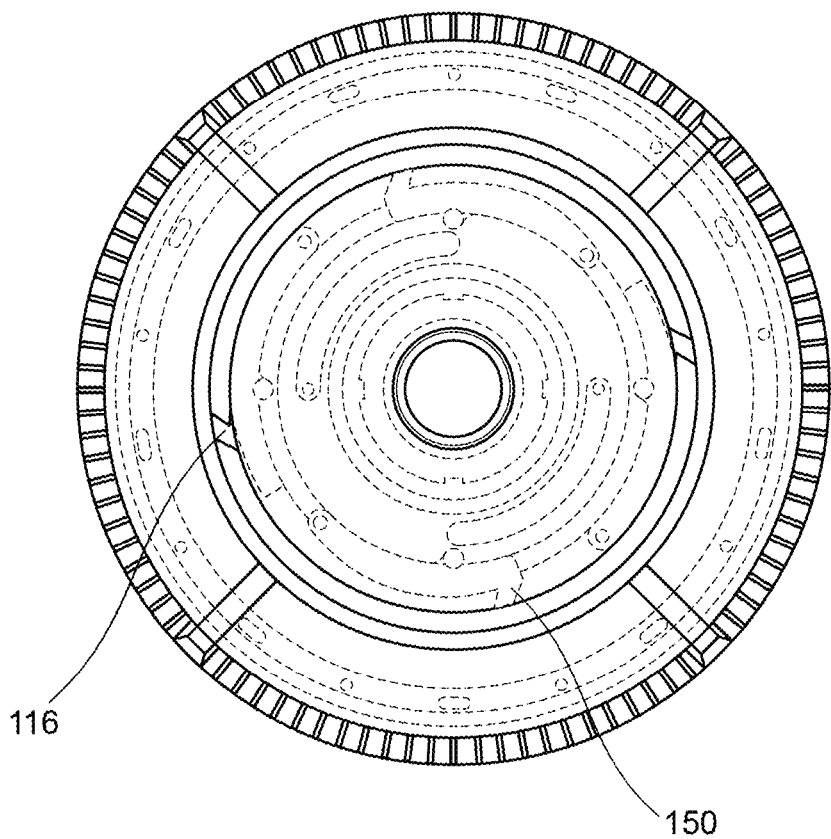
FIG. 1D illustrates a top view of the scissoring mechanism in the stowed configuration of the driven blade and the following blade, according to various embodiments.
Figure 1E:
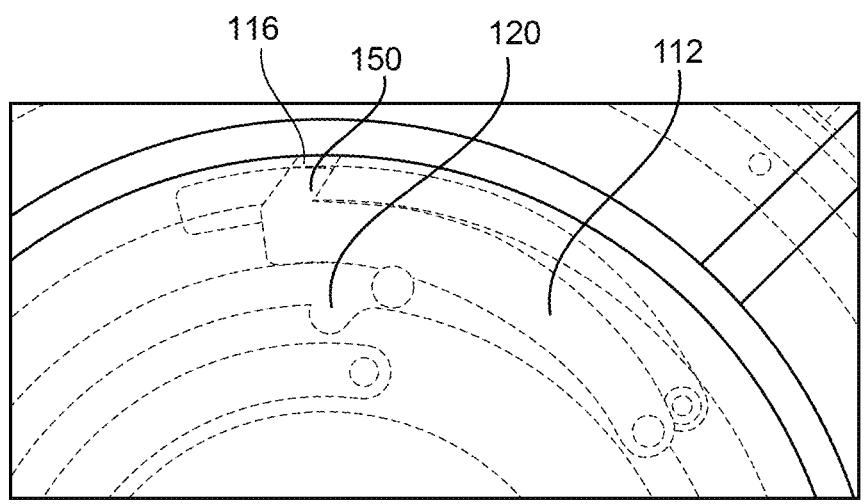
FIG. 1E illustrates a close-up top view of the scissoring mechanism in the deployed configuration of the driven blade and the following blade, according to various embodiments.

FIG. 1B-1C illustrate a first embodiment of the scissoring mechanism including travel stops 160, and FIG. 1D-1E illustrate a second embodiment of the scissoring mechanism free of travel stops.

FIG. 1B illustrates a cut-out view of the scissoring mechanism 130 in the stowed configuration of the driven blade 104 and the following blade 102. FIG. 1C illustrates a top view of the scissoring mechanism 130 in the stowed configuration of the driven blade 104 and the following blade 102. In the stowed configuration, the rollers 111 provided on the first set of pawls 110 engage following detents 108 provided on the following ring 115. For example, the following detents 108 receive the rollers 111 therein. The first set of pawls 110 (e.g., driven pawls) function as a positioning mechanism to keep the following blade 102 and the driven blade 104 in the stowed configuration. The rollers 118 provided on the second set of pawls 112 (e.g., following pawls) engage the latch detents 120 on the latch ring 135. For example, the latch detents 120 receive the rollers 118 therein. Further, in the stowed configuration, the pallets 150 provided at a first end (e.g., free end) of the second set of pawls 112 engage the driven detents 116 on the driven ring 125. For example, the driven detents 116 receive the pallets 150 therein. The second set of pawls 112 function as a latch mechanism to keep the following blade 102 and the driven blade 104 in the deployed configuration. Engaging the latch mechanism locks the following blade 102 at the predetermined angle with respect to the driven blade 104 in the deployed configuration allowing the following blade 102 and the driven blade 104 to rotate together.

The pawls, detents, pallet, and stops define the relationship between the rings 115, 125, 135 as the scissoring mechanism 130 cycles between the stowed and deployed configurations. According to some embodiments, magnets may be coupled to the first set of pawls 110 or the second set of pawls 112 to provide sufficient latching torque.

When the rollers 111 are stored in corresponding following detents 108, the driven blade 104 is locked in a stationary position relative to the following blade 102. When the rollers 118 are stored in corresponding detents 120, the following blade 102 is locked in a stationary position.

During the operation, when transitioning from a stowed configuration to a deployed configuration, the motor torque overcomes a latch torque of the driven pawls 110 resting in the corresponding following detents 108 that are spring-loaded. The motor torque will overcome the latch torque and drive the driven blade 104 to its deployed state. The pallets 150 of the following pawls 112 will travel (e.g., rotate) toward the driven detents 116 formed on the driven ring 125. In the fully deployed configuration of the driven blade 104, the pallet 150 is received in the driven detent 116, which forces the rollers 118 to release from their receiving detents 120. The act of forcing the roller 118 coupled to the following pawl 112 out of the detent 120 also engages the pallet 150 of the following pawl 112 in the driven detent 116 that will then hold the driven blade 104 and the following blade 102 in the deployed state.

The system described herein is configured to apply the full negative and positive torque above a threshold speed (e.g., about 500 rpm) and drive the blades 102, 104. During deployment (e.g., from the stowed configuration to the deployed configuration) of the blades 102, 104 and/or the scissoring mechanism 130, the positioning and movement of the following pawls 112 (and the roller 118 being kept in the detent 120) keeps the following blade 102 from following the driven blade 104 in the deployment. The following blade 102 does not move during the entire deployment sequence, the driven blade 104 moves away from the following blade 102 from the stowed configuration to the deployed configuration.

In the deployed configuration, the blades are free to rotate in a locked state with respect to each other. The following pawls 112 are configured to continuously push to collapse to the stowed configuration as they are spring-loaded. However, above a threshold speed, the following pawls 112 will be held outward with the centrifugal force and will operate as a single unit (as discussed below in greater detail in connection with frame 306 of FIG. 3A). According to various embodiments, the lift fan 100 is capable of being deployed at near-zero speeds.

Once the lift fans are done being used (e.g., the aircraft completed its vertical movement, for example, lifting off the ground and reaching a predetermined altitude), the lift fans decelerate below the threshold speed, which will allow the following pawls 112 to collapse and run in reverse. The scissoring mechanism 130 drops the roller 118 into corresponding detents 120 and drive the two blades 102, 104 back to the stowed configuration.

FIG. 1D-1E illustrate the scissoring mechanism free of travel stops 160. FIG. 1D illustrates a top view of the scissoring mechanism 130 in the stowed configuration of the driven blade 104 and the following blade 102. In FIG. 1D, the following pawls 112 are held in place by the rollers 118 being retained in the latch detents 120. FIG. 1E illustrates a close-up top view of the scissoring mechanism 130 in the deployed configuration of the driven blade 104 and the following blade 102. In FIG. 1E, the following pawls 112 are fully extended outward, engaged with driven detents 116. This eliminates any potential for uncontrolled movement of the following ring/rotor, eliminates the need for the following ball detent 162, and eliminates the need for a damper. In this embodiment, the scissoring operation may occur at low speed to ensure low impact loads on the pawls 112 during deploy and stow routine.

In the scissoring mechanism illustrated in FIGS. 1B and 1C the second set of pawls 112 do not engage the driven detents 116 until a centrifugal force pushes the pallet 150 out in a radial direction into the driven detent 116. On the other hand, in the scissoring mechanism illustrated in FIGS. 1D and 1E, the second set of pawls, upon disengagement from the latch detent 120, simultaneously engage the pallet 150 radially into the driven detent 116.

Figure 2A:
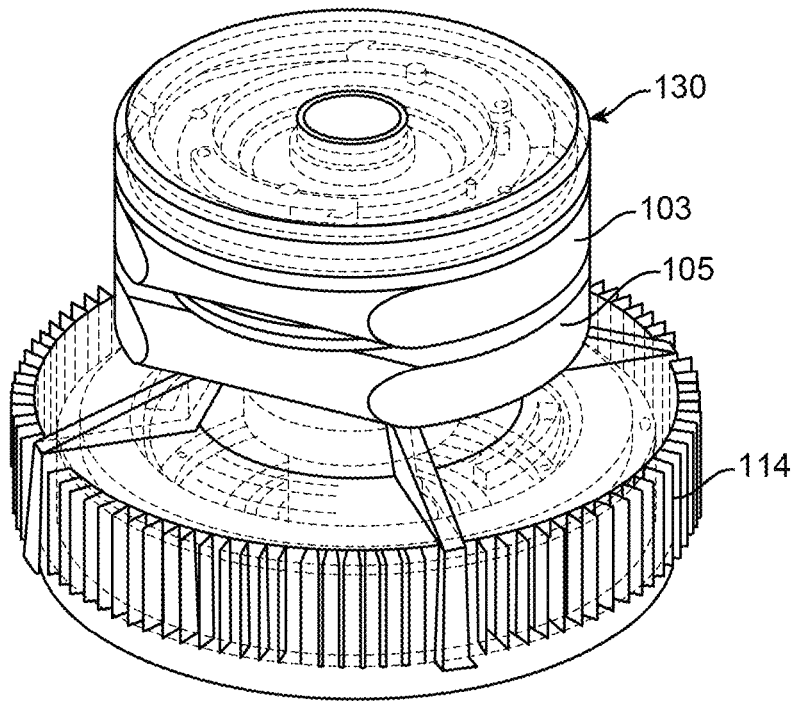
FIG. 2A illustrates an isometric view of the lift fan including a scissoring mechanism, according to some embodiments.
Figure 2B:
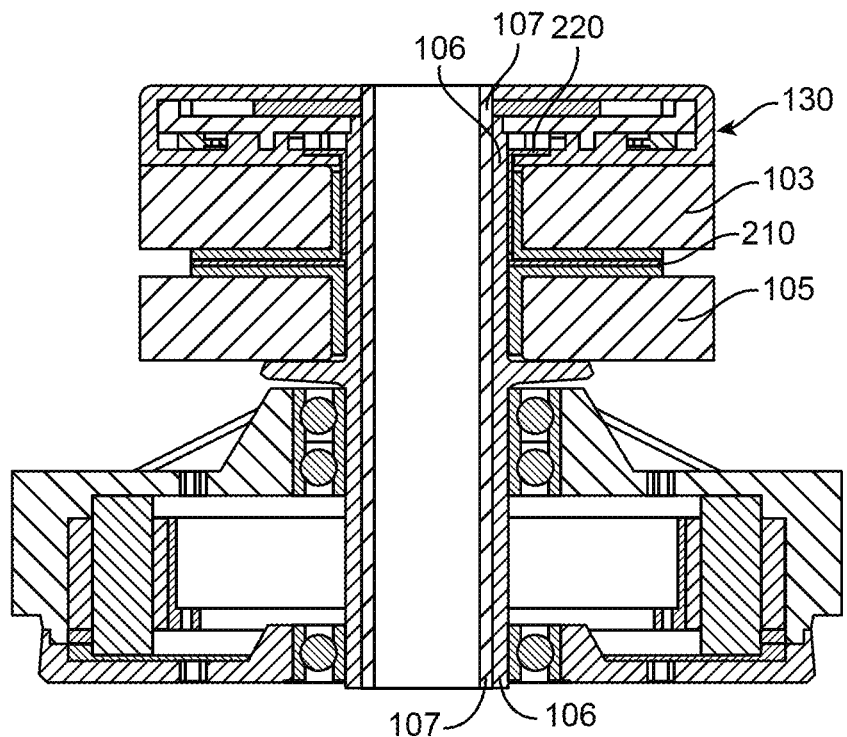
FIG. 2B illustrates a cross section view of the lift fan including a scissoring mechanism, according to same embodiments.

FIG. 2A illustrates an isometric view of the lift fan without the blades, according to some embodiments. The following blade 102 illustrated in FIG. 1A is configured to be coupled to the following rotor 103, and the driven blade 104 illustrated in FIG. 1A is configured to be coupled to the driven rotor 105. FIG. 2B illustrates a cross section view of the lift fan, according to same embodiments. The components illustrated in FIGS. 2A-2B are similar to the components illustrated and discussed in connection with FIGS. 1A-1E. Description of similar items are omitted herein. FIG. 2B illustrates a sleeve bearing 220 between the motor shaft 106 and the following rotor 103, as well as a thrust bearing 210 provided between the following rotor 103 and the driven rotor 105.

In the embodiments illustrated in FIGS. 1A-2B, the scissoring mechanism 130 is coupled above the blades, away from the motor 114. This positioning of the scissoring mechanism 130 provides for easy access for assembly and maintenance of the scissoring mechanism 130. In addition, the positioning above the blades provides for shortest possible stack height and rotor offsets. However, embodiments are not limited to the top positioning of the scissoring mechanism. In some embodiments, the scissoring mechanism 130 may be provided below the motor, as shown in and discussed in connection with FIG. 4.

Figure 3A:
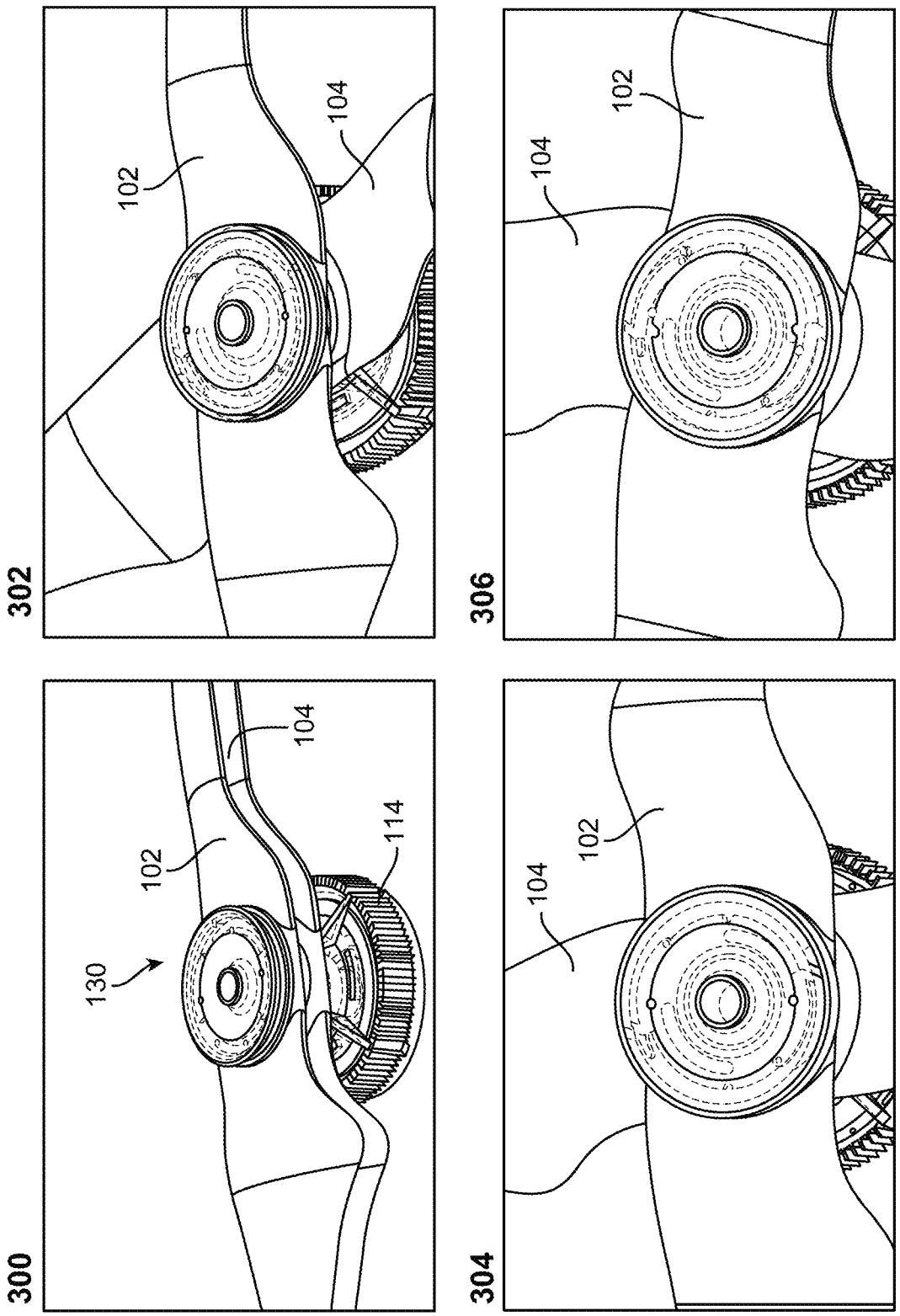
FIGS. 3A-3B illustrate snapshots from the motion of the lift fan from a stowed configuration to a deployed configuration, and back to stowed configuration using the scissoring mechanism described herein according to various embodiments.
Figure 3B:
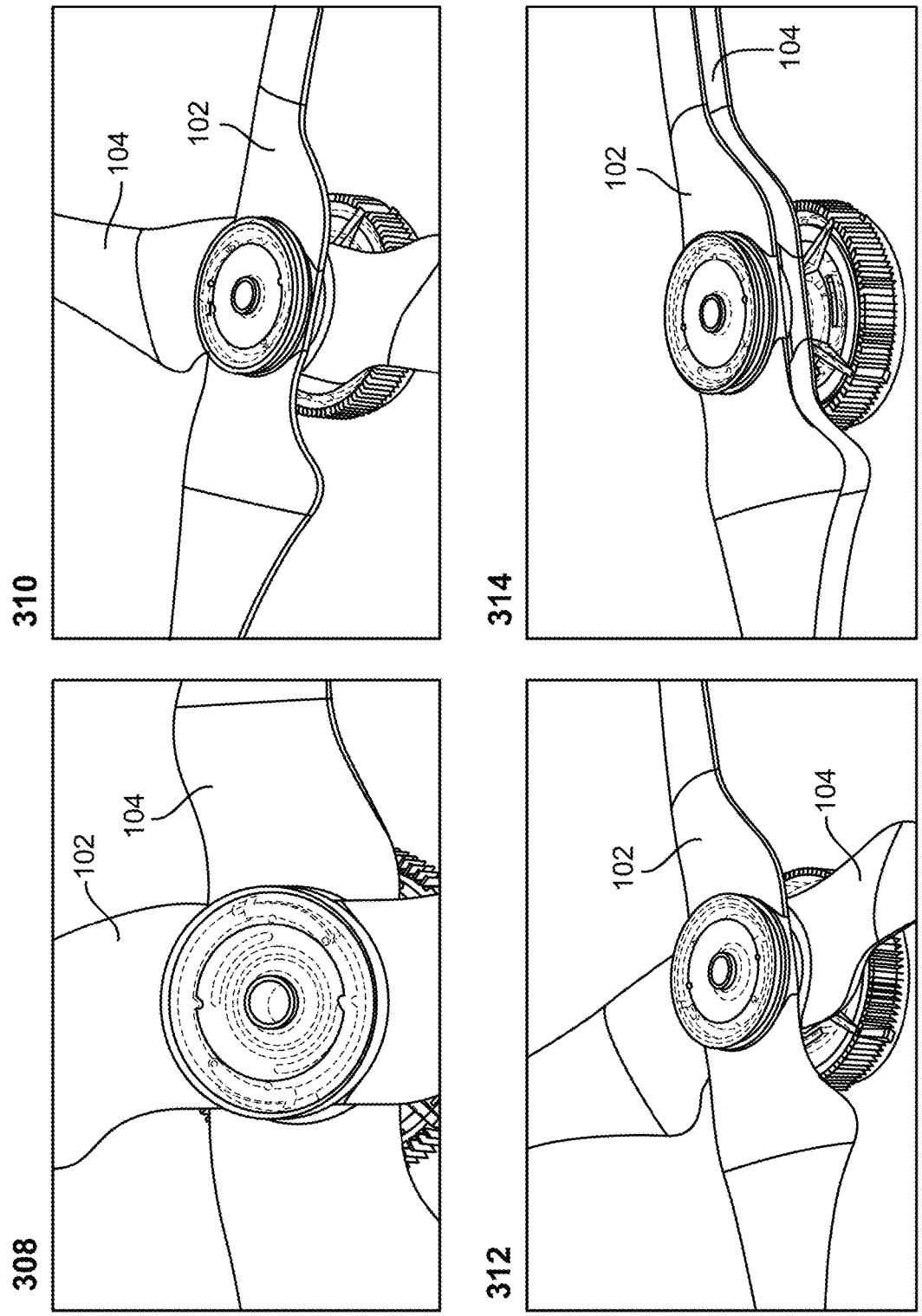

As explained, the scissoring mechanism 130 change the relative position of the driven blade 104 and the following blade 102 between a stowed and deployed configuration of the blades or the lift fan. FIGS. 3A-3B illustrate snapshots from the motion of the lift fan from a stowed configuration to a deployed configuration, and back to stowed configuration using the scissoring mechanism described herein according to various embodiments.

At frame 300, the driven blade 104 and the following blade 102 are in the stowed configuration. For example, the aircraft may be idling on the ground, or may be in a forward flight configuration. The lift fans are not being used.

At frame 302, the driven blade 104 moves in a first direction (e.g., clockwise) toward a deployed configuration. The driven blade 104 may not reach the predetermined angle with respect to the following blade 102 at this stage.

At frame 304, the driven blade 104 continues to move in the first direction, and when the driven blade 104 reaches the predetermined angle with respect to the following blade 102, the pallet 150 of the pawl 112 is received in the detent 116, which locks the driven blade 104 and the following blade 102 in the deployed configuration (see frame 306).

At frame 306, the driven blade 104 and the following blade 102 move (e.g., rotate) together in the first direction in the deployed configuration. At this stage, the roller 118 comes of out of the detent 120 to release the following blade 102 from a stationary position, allowing the following blade 102 to move with the driven blade 104 to generate or provide lift to the aircraft. For example, the aircraft may be in the liftoff or landing position, or in a vertical flight mode.

At frame 308, both blades continue rotating in the first direction. The detent 120 has a convex-to-concave shape (also shown in FIG. 1E) that allows the roller 118 to move out when moving in a direction from the convex to concave position, and allows the roller 118 to easily move back into the detent 120 when moving in the direction from the concave to convex position. Thus, while the detent 120 keeps the roller 118 in place, the shape of the detent 120 allows the roller 118 to move out of the detent 120 when enough torque is applied to move the roller 118 in the right direction.

Accordingly, to deploy the blades, the driven pawls 110 provide less locking torque than the following pawls 112, thereby forcing the driven pawls 110 to disengage first. The driven ring 125 servos about 90 degrees in a first position (e.g., clockwise), moving the driven rotor 105 to the deployed position), hitting the end of its travel stop, and engaging the following ball detent 162. Once deployed, the travel stop 160 is engaged and the motor can apply positive torque, and the following ball detent 162 is engaged allowing the motor to apply limited negative torque. The motor spins in the first direction (e.g., clockwise), forcing the following pawls 112 to release, and both the driven pawls 110 and the following pawls 112 to disengage as the rotor speed moves above a threshold speed (e.g., about 500 rpm). Once above the threshold speed, the following pawl pallet 150 engages with the driven detent 116. Once engaged, the pallet/detent arrangement allows the motor to provide both negative and positive torque as long as the motor stays above the threshold speed.

Referring to FIG. 3B, once the operation of the lift fan is complete, at frame 310 both the driven blade 104 and the following blade 102 start rotating in a second direction opposite to the first direction (e.g., counter-clockwise direction) toward a stowed configuration. Accordingly, to start the stow routine, the rotating assembly is slowed to a stop.

At frame 312, the following blade 102 is locked in the stationary position, and the driven blade 104 continues to rotate toward the stowed configuration. Once below the threshold speed, the following pallet 150 disengages from the driven detent 116, but the following ring 115 is still secured to the driven ring 125 by the holding torque of the following ball detent 162. In some embodiments, the torque may be limited below the threshold speed to a value less than the holding torque of the following ball detent 162. The driven ring 125 is then servoed in the second direction opposite to the first direction (e.g., counter-clockwise) about 180 degrees. During this process, the following ball detent 162 will disengage, and the following pawls 112 (e.g., the rollers 118 of the following pawls 112) engage with the latch detent 120. If less than 180 degrees is required to get both the driven blade 104 and the following blade 102 in the stowed position, the servo routine slips because the servo torque is less than the negative ratchet torque.

At frame 314, both blades are locked in the stowed configuration in a low drag orientation. For example, the aircraft may be idling on the ground, or may be in a forward flight configuration. The lift fans are not being used.

Various types of bearings (e.g., rolling bearings, sliding bearings, plain bearing) may be used in connection with embodiments described herein. According to various embodiments, the contact stress at pawls, pallets and detent interfaces, and the tolerance stack up of the rings, pawls, or other components may be controlled to ensure proper functioning of the scissoring mechanism.

Embodiments may include dampers to limit the speed between the driven ring 125 and the following ring 115 to alleviate the impact of the following ring 115 not being fully constrained during the deploy and stow processes. Various types of dampers (e.g., hydraulic linear damper, rotary eddy current damper, scissor mechanically sealed and bathed in oil) are all within the scope of the embodiments described herein.

During the spin-down, once the motor speed has dropped below the threshold speed, the pawl 112 will try to drop out of its deployed position, which may result in permanent damage to the scissoring mechanism and loss of rotor. To help prevent this, a negative ramp angle on the driven detent 116 may be implemented. This will keep the pawl 112 engaged in the deployed position by keeping the pallet 150 of the pawl 112 in the driven detent 116 even below the threshold RPM, so long as a negative torque is continuously applied.

According to various embodiments, the spring force acting on the pawl 112 may push the roller 118 into the latch detent 120. In some embodiments, the scissoring mechanism 130 may be modified to have a spring force acting in an opposite manner, that is to push the pawl 112 (e.g., the pallet 150 of the pawl 112) toward the driven detent 116. This configuration may be desirable in case of failure of any kind, where it is preferable to have the blades in the deployed state when the system could get thrust from the rotors. The mere disadvantage of having the blades stuck in the deployed state is the extra drag in forward flight, which is a tolerable situation. In the alternate configuration, by reversing the spring force, the pawl 112 is configured to want to always get stuck in the deployed configuration. To move from the deployed configuration to the stowed configuration with the alternate configuration, the magnet on the pawl 112 may be brought closer to a coil on the fixed latch ring 135 to energize the coil (e.g., a Lorentz force actuator, voice-coil actuator type setup where when the magnet is near the coil, the coil is energized). The energized coil will overcome the spring force that is holding the pallet 150 in the driven detent 116 in the deployed configuration, and move the pallet 150 out of the driven detent 116 to stow the blades. In this alternate configuration, even when there is a failed component (e.g., a failed solenoid), the blades can still be deployed, even though the blades may not be re-stowed. However as explained above, failure in the deployed state is preferred to failure in the stowed state.

Figure 4:
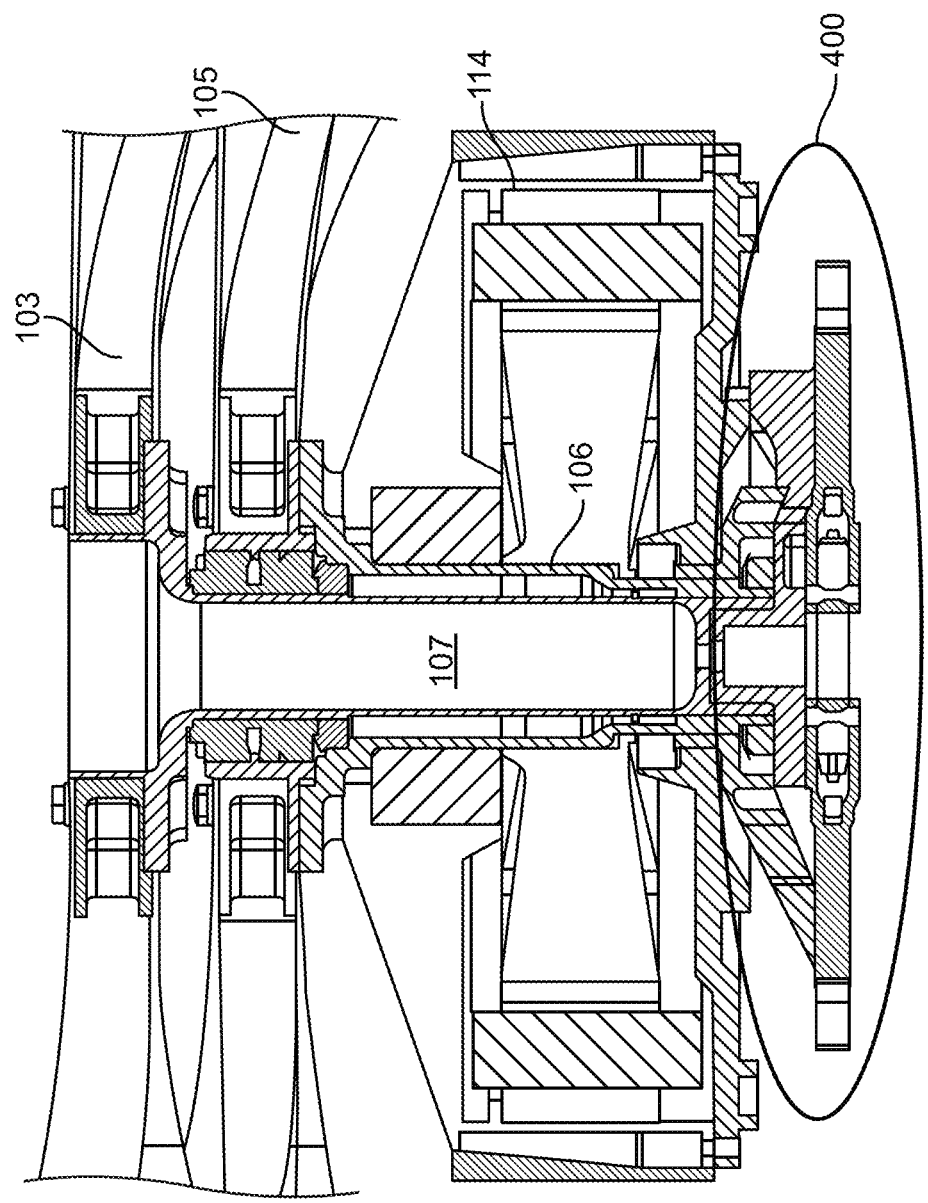
FIG. 4 illustrates another exemplary scissoring mechanism, according to various embodiments.
Figure 5:
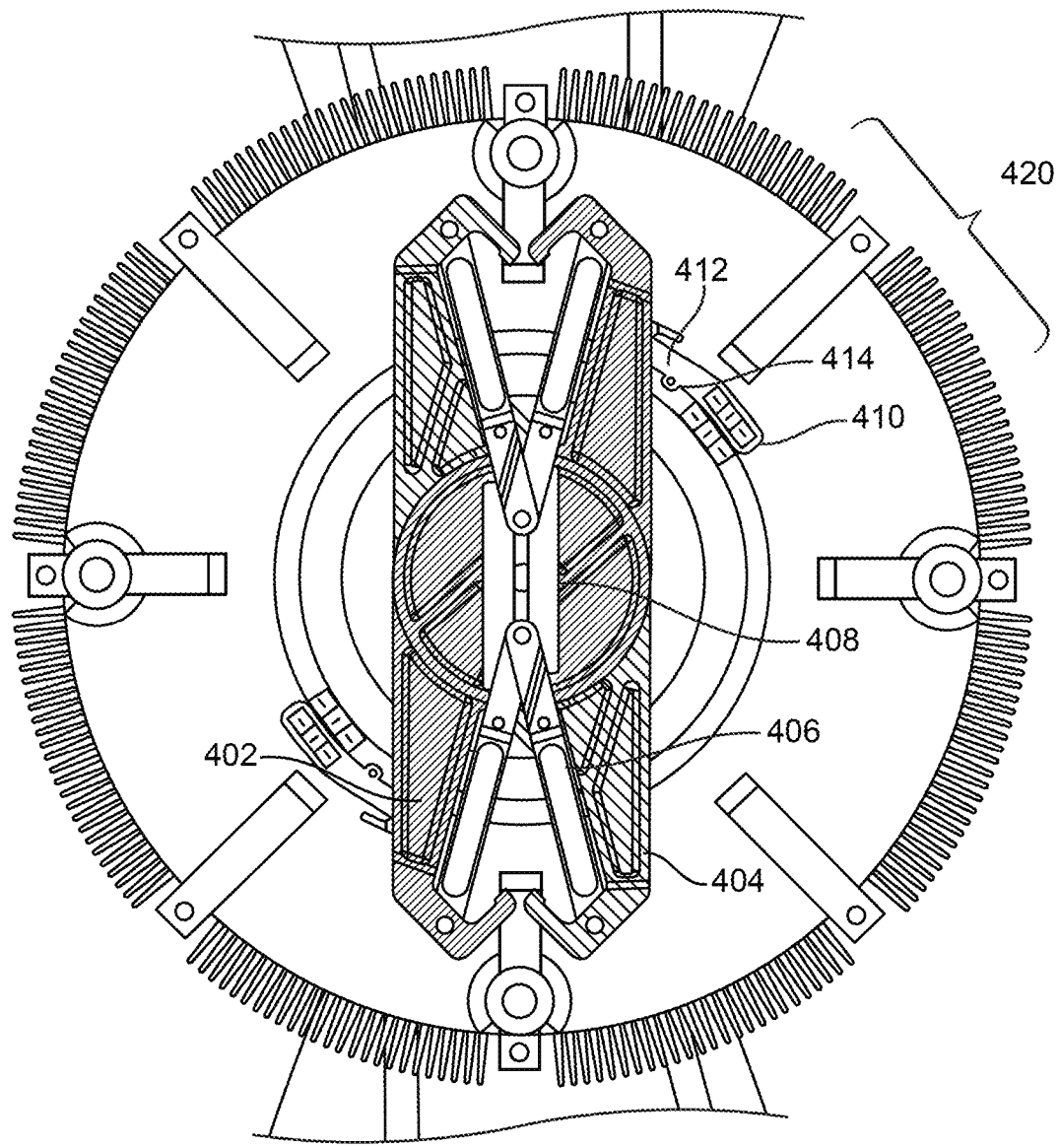
FIG. 5 illustrates the scissoring mechanism of FIG. 4 in a stowed configuration, according to various embodiments.
Figure 6:
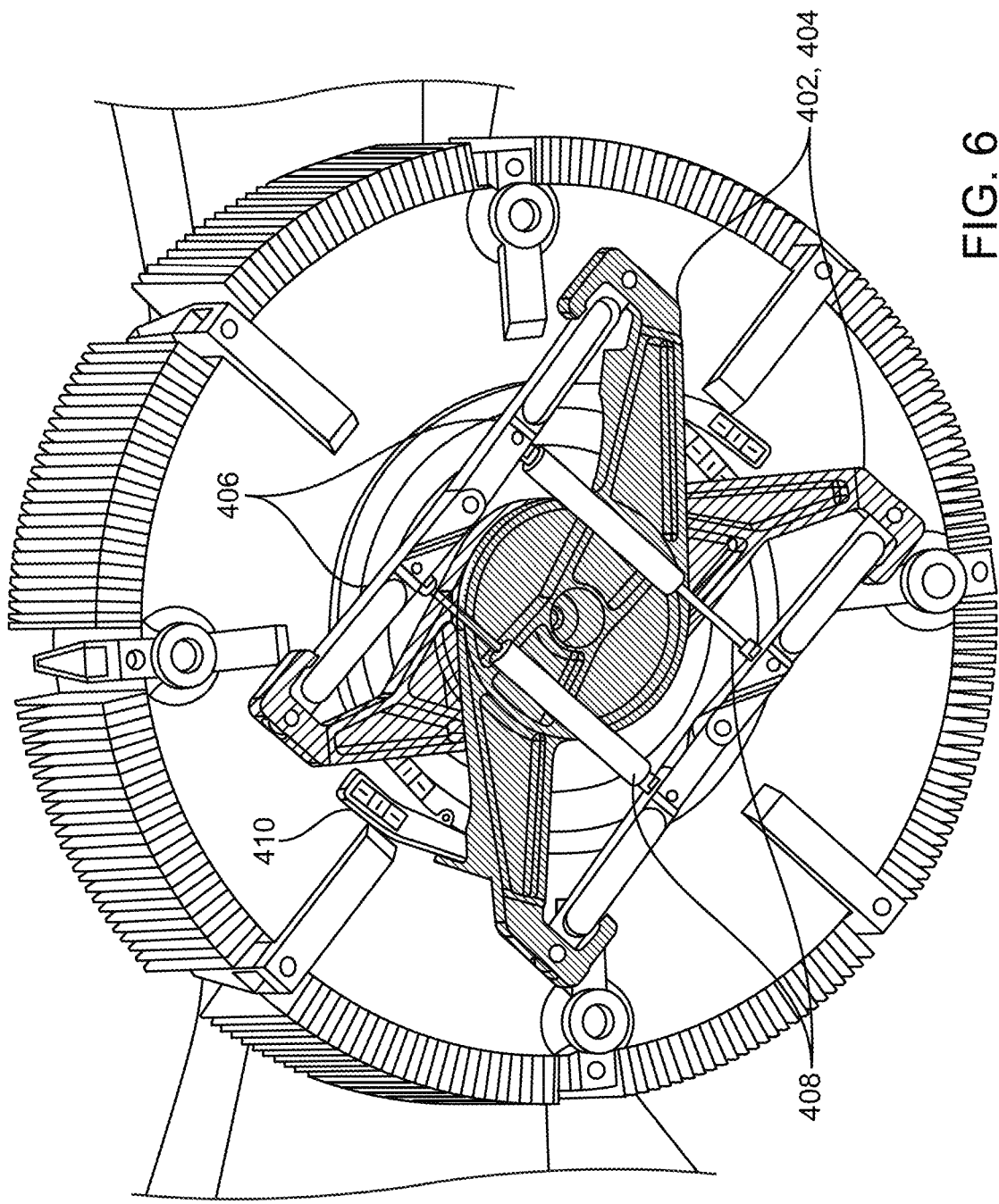
FIG. 6 illustrates the scissoring mechanism of FIG. 4 in a deployed configuration, according to various embodiments.

FIGS. 4-6 illustrate another embodiment of the scissoring mechanism according to various embodiments. In the embodiment illustrated in FIGS. 4-6, the scissoring mechanism 400 is coupled below the motor 114, away from the blades 102, 104. FIG. 4 illustrates various components of the scissoring mechanism 400. FIG. 5 illustrates the scissoring mechanism 400 in a stowed configuration. FIG. 6 illustrates the scissoring mechanism 400 in a deployed configuration.

As shown in FIGS. 4-6, the scissoring mechanism 400 includes two "arms": a following arm 402 coupled to the following shaft (e.g., latch post 107), and a driven arm 404 coupled to the driven shaft (e.g., the motor shaft) 106. Each one of the arms 402, 404 is coupled to a set of scissor links 406 and damped gas-springs 408 to control the deploy and stow action of the blades 102, 104 corresponding to the rotors 103, 105. The arms, the scissor links and the damped gas-springs function as a positioning mechanism to keep the following blade 102 and the driven blade 104 in the stowed configuration. Disengaging the positioning mechanism moves the driven blade 104 to a predetermined angle with respect to the following blade 102 in the deployed configuration while the motor is operating at near-zero speed.

The scissoring mechanism 400 further includes a latching mechanism 420 to lock the blades 102, 104 in the deployed configuration. Engaging the latching mechanism 420 locks the following blade 102 at the predetermined angle with respect to the driven blade 104 in the deployed configuration allowing the following blade 102 and the driven blade 104 to rotate together.

In the stowed configuration of the scissoring mechanism 400 shown in FIG. 5, the driven rotor 105 and the driven shaft (e.g., the motor shaft 106) are rigidly connected to the motor 114, and connected to the following rotor 103 and the following shaft (e.g., the latch post 107) via the scissor links 406 and gas-springs 408. The damped gas-springs 408 may be of the retracting type and naturally want to collapse the scissor link 406 which pulls the two rotors 103, 105 into alignment with each other in the stowed configuration.

In addition to the scissoring mechanism 400, the lift fan shown in FIGS. 4-6 includes a latch mechanism 420 (illustrated in FIGS. 5-6). The latch mechanism 420 comprises two pawls 412 (e.g., arms) that may be, for example, spring-loaded and want to collapse inward to engage the latch detent 414. In some embodiments, the pawls 412 may be assisted by a magnet array (e.g., latch retention magnets) 410 that provides additional force and increases the hold torque of the latch mechanism 420. For example, a pair of opposite polarity magnets may be coupled to the pawls 412 and the latch detent 414, respectively, such that in the stowed configuration, the pawls 412 are held on the 414 detent by a magnetic force. According to various embodiments, the pawls 412 may only be connected to the following arm 402 of the scissoring mechanism 400. Therefore, in the stowed position, the latch mechanism 420 constrains the following rotor 103 to the fixed structure, and the scissoring mechanism 400 (in the collapsed state) constrains the driven rotor 105 to the following rotor 103. In this way, both the driven rotor 105 and the following rotor 103 are constrained in a low drag position.

While the pawl 412 of the scissoring mechanism 400 shown in FIGS. 4-6 have similarities with the pawl 112 of the scissoring mechanism 130 shown in FIGS. 1A-2B, one difference is that the pawl 112 has a dual function: (1) to lock the rotors in the deployed state, and (2) act as a position lock. In the scissoring mechanism 400, the position lock functionality is performed by the over-center gas-springs 408.

As shown in FIG. 5, the scissoring mechanism 400 is in a stowed configuration, the gas-springs 408 are in a retracted or closed state. FIG. 6 illustrates the scissoring mechanism 400 in a deployed configuration where the gas-springs 408 are in an extended or open state. The movement of the scissoring mechanism 400 between the stowed and deployed configuration will be described next referring to FIGS. 7A-7B.

Figure 7A:
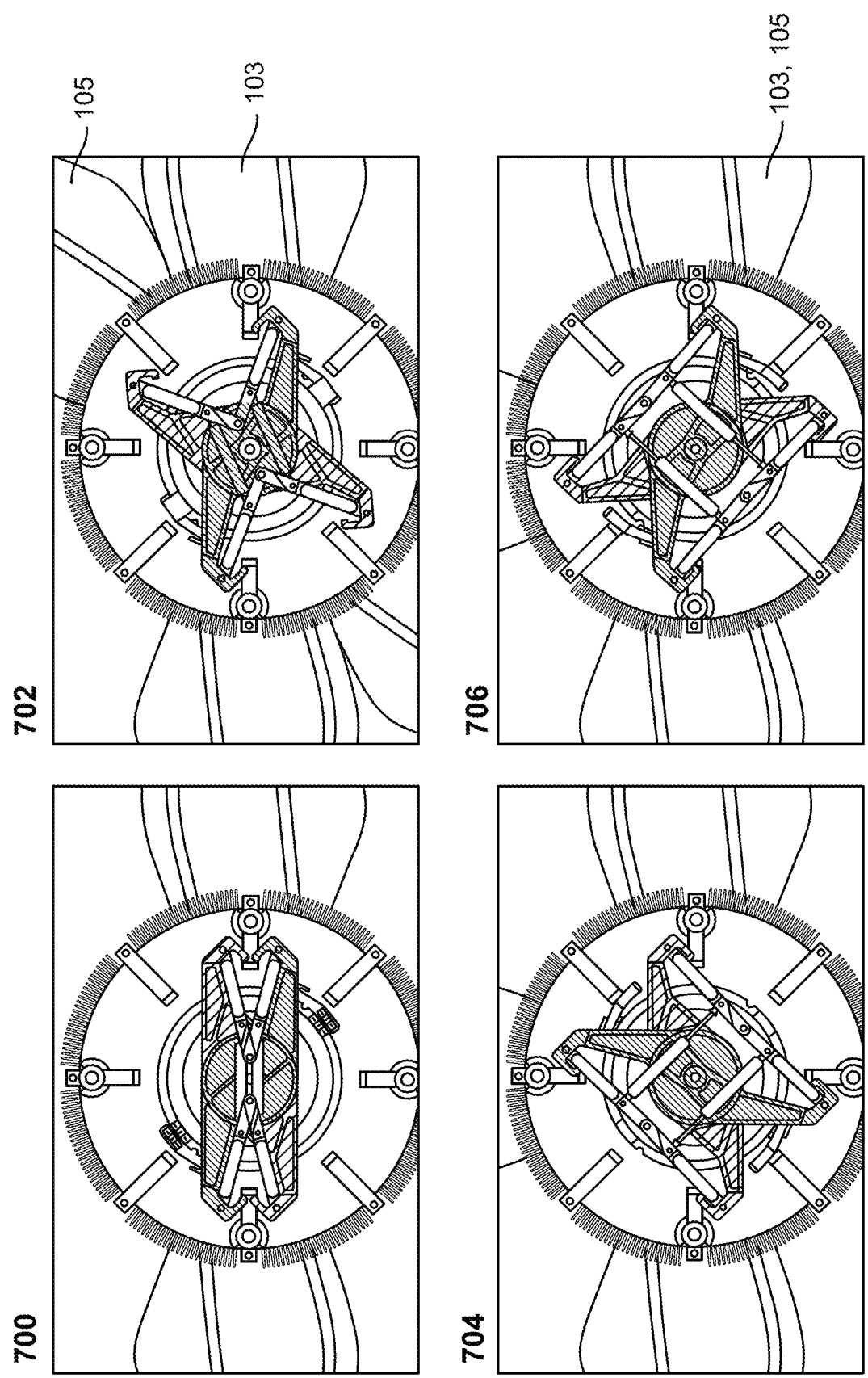
FIG. 7A illustrates snapshots from the deploy operation of the scissoring mechanism of FIG. 4 from the stowed configuration to the deployed configuration, according to various embodiments.

FIG. 7A illustrates snapshots (e.g., frames) from the deploy operation of the scissoring mechanism 400 from the stowed configuration at frame 700 (also shown in FIG. 5) to the deployed configuration at frame 706 (also shown in FIG. 6). During the deploy operation, the motor 114 is servoed 90 degrees (e.g., until the motor gets to an end of its stroke), unfolding the scissor links 406, and moving the driven rotor 105 to the deployed orientation, as shown in frame 702.

At frame 702, the following rotor 103 is still constrained by the latch mechanism 420 in the stowed position. Once the scissor links 406 reach the end of their travel as shown in frame 702, the scissor links 406 pull on the following rotor 103 and, with enough torque, force the latch pawls 412 to release from the corresponding detents 414.

Once the pawls 412 are released from the detents 414 as shown in frame 704, both rotors 103, 105 are free to rotate. The motor speed will be increased to spin up the rotors 103, 105. Once sufficient speed has been achieved (e.g., a threshold speed is reached), both the latch pawls 412 and the scissor links 406 are pulled out radially due to the resulting centrifugal force, as shown in frame 706. The centrifugal force is great enough to overcome the opposing spring forces on the latch pawls 412 and the scissor links 406. In essence, the scissoring mechanism 400 is adapted to be deployed at zero speed. According to various embodiments, the scissoring mechanism 400 may require the threshold speed to be held in the deployed configuration by the centrifugal force generated at the threshold speed. As long as the speed is held above the threshold speed, the scissoring mechanism 400 remains locked in the deployed state, and the latch pawls 412 remain disengaged from the detents 414, as shown in FIG. 6. Full positive and negative torque can be applied.

Figure 7B:
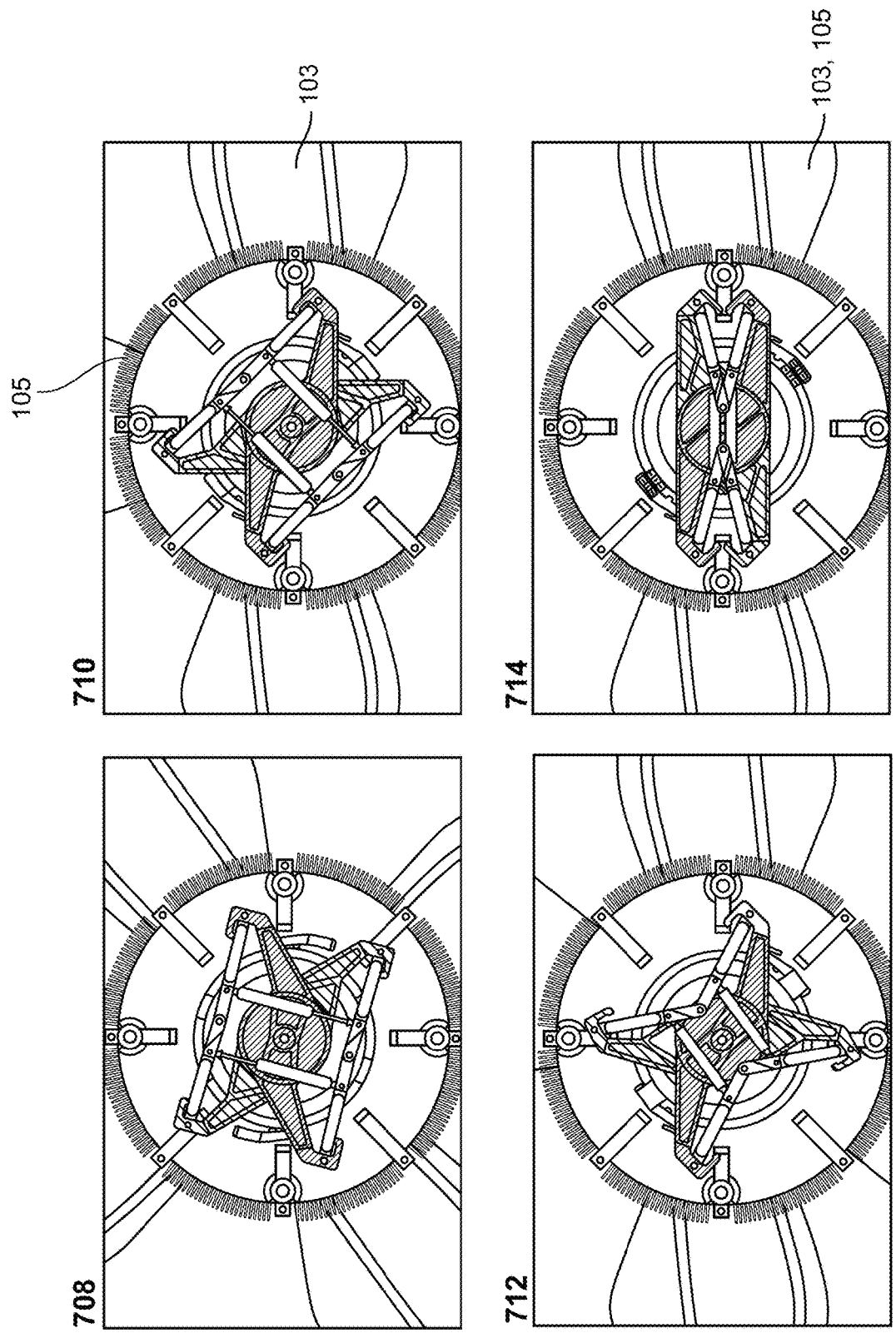
FIG. 7B illustrates snapshots from the stow operation of the scissoring mechanism of FIG. 4 from the deployed configuration to the stowed configuration, according to various embodiments.

FIG. 7B illustrates snapshots (e.g., frames) from the stow operation of the scissoring mechanism 400 from the deployed configuration at frame 708 (also shown in FIG. 6) to the stowed configuration at frame 714 (also shown in FIG. 5), while the motor speed (and hence the speed of the rotors 103, 105) is reduced to below the threshold speed. As the speed drops below the threshold speed, the spring-loaded latch pawls 412 is pulled back in, as illustrated in frame 708. This will cause the scissor links 406, with help from the gas-springs 408, to naturally collapse the scissoring mechanism 400 as the rotors 103, 105 slow to a stop, as shown in frame 712. After being slowed to a stop, the driven rotor 105 will be driven in reverse until the latch pawls 412 re-engage with the latch detents 414. As shown in frame 714, the rotors 103, 105 are aligned with each other and latched in the low drag position.

Figure 8A:
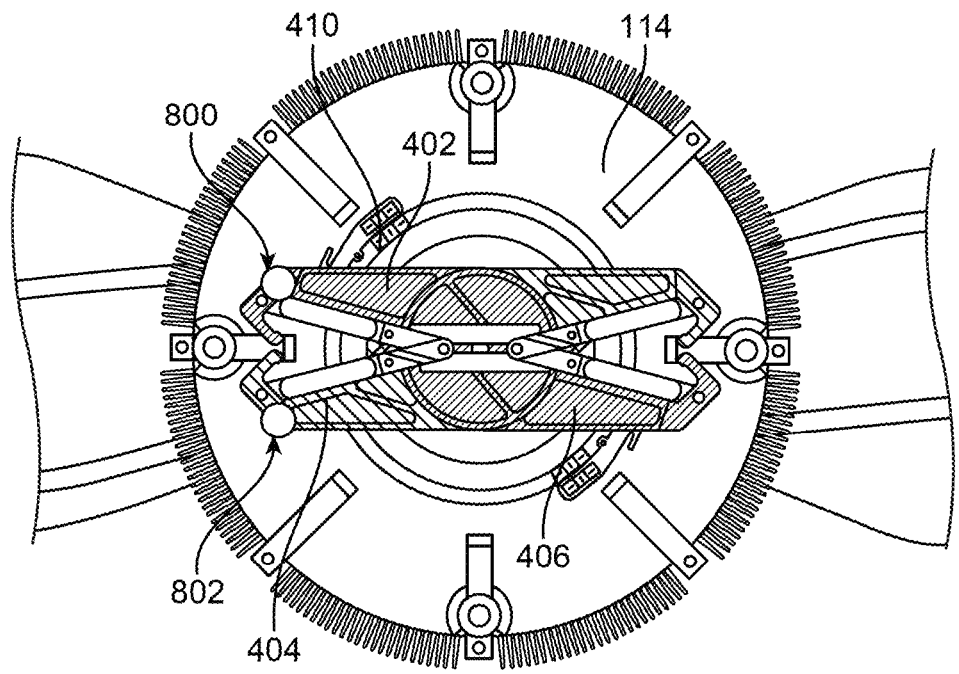
FIG. 8A illustrates an exemplary sensor-feedback scissoring mechanism in a stowed configuration, according to various embodiments.
Figure 8B:
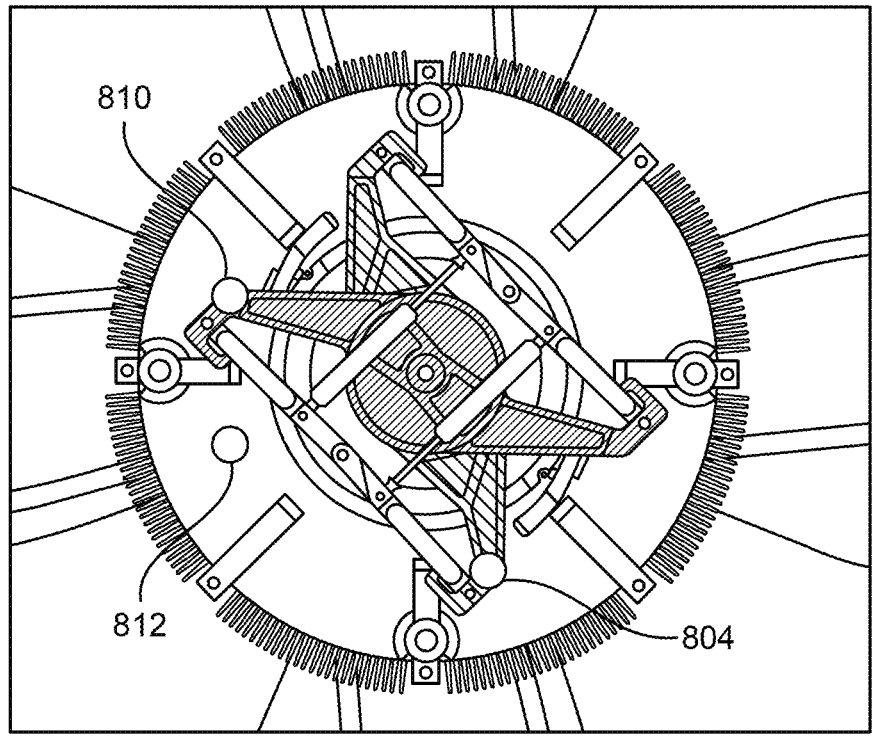
FIG. 8B illustrates an exemplary sensor-feedback scissoring mechanism in a deployed configuration, according to various embodiments.

FIG. 8A illustrates an exemplary sensor-feedback scissoring mechanism in a stowed configuration, according to various embodiments. FIG. 8B illustrates an exemplary sensor-feedback scissoring mechanism in a deployed configuration, according to various embodiments. In order to detect that the scissor mechanism 400 and latch mechanism 420 are functioning correctly, sensors 800, 802 may be coupled to the scissoring mechanism 400. According to some embodiments, the sensors 800, 802 may include hall effect sensor(s). The sensors 800 and 802 may be located on the motor 114. Each sensor location may have a corresponding magnet located on the arms 402, 404 that triggers the sensor 800, 802 at a preset voltage threshold. For example, the first sensor 800 may be located at position 810 on the motor 114 (as illustrated in FIG. 8B) to confirm that the following arm 402 is in the stowed position. The second sensor 802 may be located at position 812 on the motor 114 (as illustrated in FIG. 8B) to confirm that the driven arm 404 is in the stowed position.

During the deploy operation, the motor may be servoed with a set amount of torque until the scissor links 406 reach the end of their travel and stall the motor. After a prescribed amount of time, the motor may be given a torque command, forcing the latch retention magnets 410 to release and allowing the rotors 103, 105 to accelerate. Once the rotors 103, 105 begin to spin, the sensors 800, 802 provide a voltage pulse at each position once every revolution that can be used to verify that the scissor arms 402, 404 are lagging each other at the correct distance and confirm the scissoring mechanism 400 is functioning correctly. In some embodiments, the sensor feedback may be used to obtain the speed. If positive feedback is required to determine that the scissor mechanism 400 has deployed successfully prior to increasing the speed to operational speed, then a third sensor may be added at position 804 shown in FIG. 8B.

Figure 9:
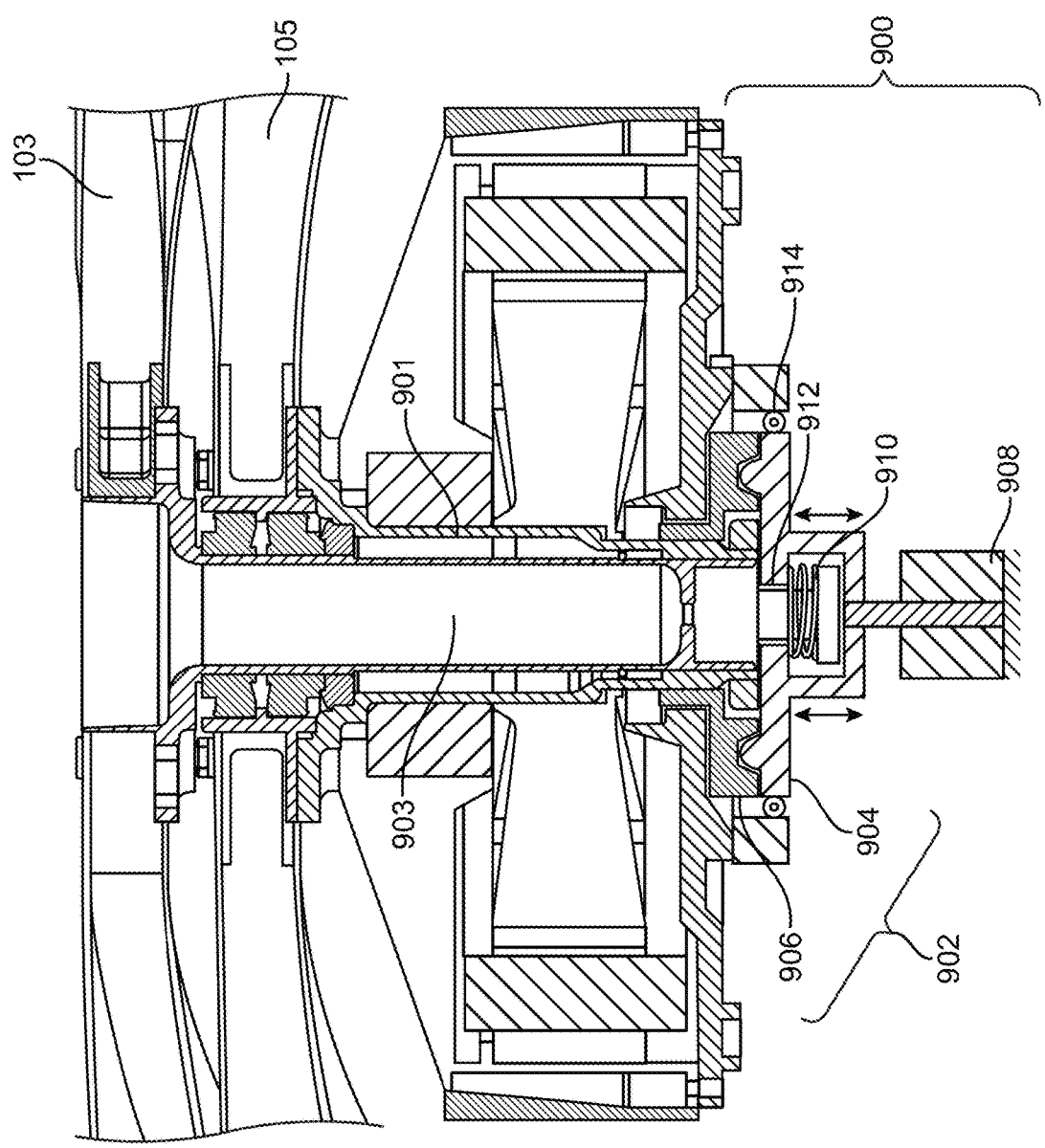
FIG. 9 illustrates a solenoid-enabled disengageable coupler scissoring mechanism, according to various embodiments.

FIG. 9 illustrates a solenoid-enabled disengageable coupler scissoring mechanism, according to various embodiments. Similar to the scissoring mechanism 400 illustrated in FIG. 4, the exemplary solenoid-enabled disengageable coupler scissoring mechanism 900 may be provided below the motor hub or motor unit, away from the rotors and blades. Unlike the scissoring mechanism 400 or the scissoring mechanism 130, the scissoring mechanism 900 includes a disengageable coupler 902 rather than a linkage (as in scissoring mechanism 400) or a set of pawls and detents (as in scissoring mechanism 130).

In FIG. 9, the two independent concentric shafts (e.g., the motor shaft 901 and the latch post 903) are linked with the disengageable coupler 902 having a sliding portion 904 and a fixed portion 906. The fixed portion 906 of the coupler 902 is connected to the motor shaft 901. The sliding portion 904 of the coupler 902 is connected to the latch post 903 via a ball spline 912 allowing for axial movement while still being able to transmit torque. According to some embodiments, the coupler portions may be flipped, placing the sliding portion 904 is provided above the fixed portion 906, so that gravity is assisting with engagement.

In the scissoring mechanism 900, a solenoid 908 may be used to disengage the sliding portion 904 of the coupler 902 from the fixed portion 906, and a spring 910 may be used to re-engage the sliding portion 904 and the fixed portion 906. According to various embodiments, the solenoid 908 may be replaced with a voice-coil actuator (VCA) having higher force density than the solenoid. The spring 910 may be replaced with magnets as to force coupler engagement.

The scissoring mechanism 900 may include latch pawls 914 to hold the rotors in the low drag orientation. The latch pawls 914 may also constrain the latch post 903 when the coupler 902 is disengaged during deploy and stow operations. During normal operation, the solenoid 908 is energized (thereby disengaging the coupling) and the motor is servoed to the deployed configuration. Thereafter, the solenoid 908 is de-energized (thereby re-engaging the coupling), and the rotors 103, 105 can then be spun up. For stowing, the rotors 103, 105 will be slowed to a stop and servoed to the low drag orientation, engaging the latch pawls 914. The rotors 103, 105 may be stowed using the reverse of the process used to deploy.

In operation from the stowed configuration to a deployed configuration, the solenoid 908 is engaged, decoupling the coupler 902 (e.g., pulling the sliding portion 904 away from the fixed portion 906 toward the solenoid 908). The driven rotor 105 will be servoed 90 degrees to have the rotors 103, 105 in the deployed state. At this point, the solenoid 908 is released, reengaging the coupler 902 (e.g., releasing the sliding portion 904 from the solenoid 908 toward the fixed portion 906). The motor torque may drive the deployed rotors 103, 105 off the latch pawls 914, and spin up to a normal operation. According to various embodiments, a threshold speed may be required to release the latches as the latches are spring-loaded and require a centrifugal force to fully release them. When it is time to stow the rotors 103, 105, the rotors first decelerate until the locking pawls and detents are aligned. Once the locking pawls and detents are aligned, the coupler 902 is disengaged using the solenoid 908, and the rotors are turned 90 degrees to the collapsed or stowed configuration. According to various embodiments, the latch pawls 914 and detents 914 may function similarly to the embodiments illustrated in other figures (e.g., similar to latch pawl 412 shown in FIG. 5). The description of these components are not reiterated in connection with FIG. 9 for sake of brevity.

According to various embodiments, the sliding portion 904 may include a protrusion (e.g., a tooth) that is received in a cavity of the fixed portion 906 when the coupler is engaged. The cavity may be shaped and dimensioned based on a shape and dimension of the tooth. That is, the tooth and cavity may conform to a tooth profile. In the event of a solenoid failure, tooth profiles for each portion 904, 906 of the coupler 902 may be configured to allow a predetermined amount of motor torque to overcome the breakout torque of the coupler 902 in the stowed configuration, and allow the rotor to be servoed to the deployed configuration. The tooth profiles for each portion 904, 906 of the coupler 902 may be configured to result in the coupler 902 to self-lock to withstand full motor torque in the deployed configuration and require the solenoid 908 to disengage the coupling. In this way, the rotors wills always be able to get to (and stay in) the deployed configuration even if the solenoid(s) fail, reducing the severity of a failed actuator.

Figure 10:
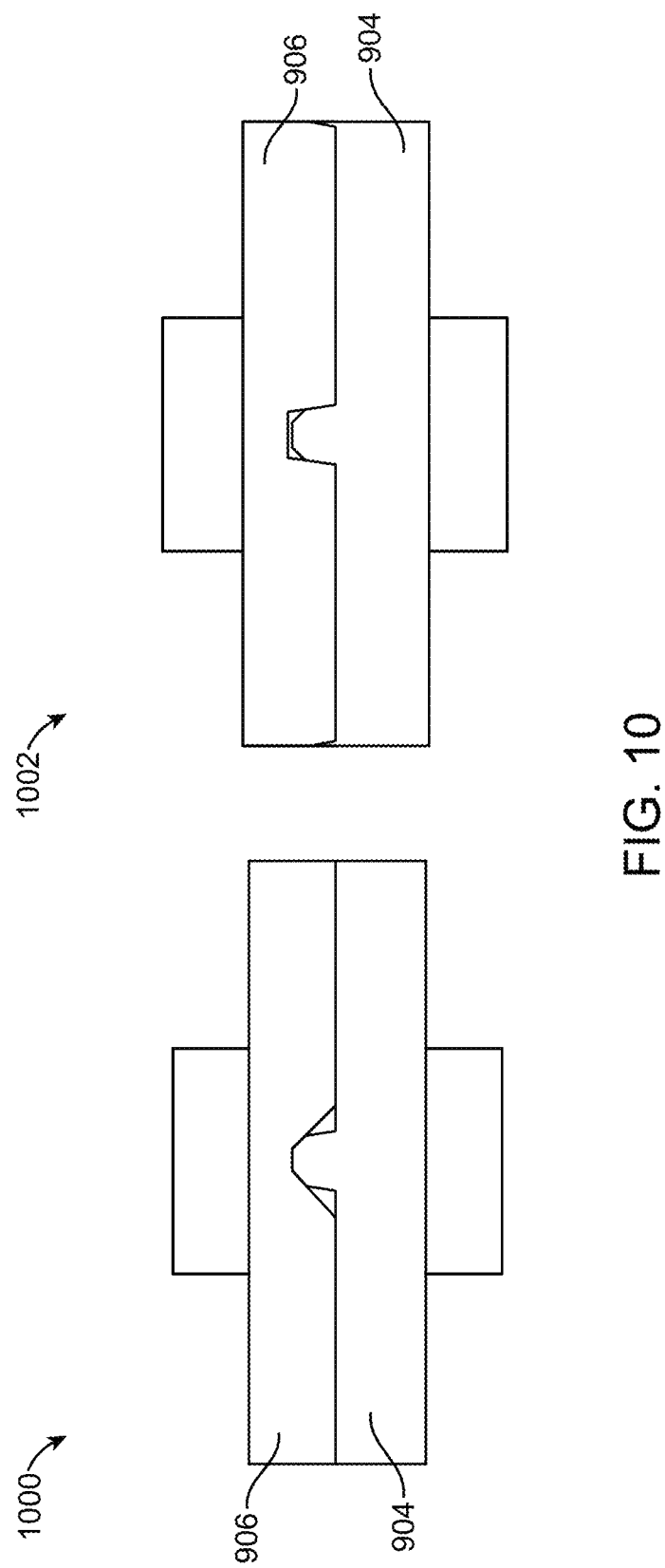
FIG. 10 illustrates exemplary tooth profiles for the coupler illustrated in FIG. 9, according to various embodiments.

FIG. 10 illustrates exemplary tooth profiles 1000, 1002 for the coupler 902 positions. Providing the sliding portion 904 and the fixed portion 906 with shallow ramp angles as shown in the tooth profile 1000 allows the coupler to disengage with enough motor torque in the stowed position. Providing the sliding portion 904 and the fixed portion 906 with steep ramp angles as shown in the tooth profile 1002 ensures that the coupler stays engaged at any motor torque in the deployed position. According to various embodiments, the coupler may have travel stops to limit relative motion between the shafts/rotors (0 and 90 degrees for stowed and deployed positions, respectively). The travel stops prevent any over-travel, and eliminate the need for precise position control of the motor.

Pushrod-and-Cam Scissor Mechanism

FIGS. 11A-11D illustrate components of an exemplary pushrod-and-cam scissor mechanism 1100 according to various embodiments. The pushrod-and-cam scissor mechanism 1100 may be activated by centrifugal force, as explained below. A following blade 1102 is coupled to a following rotor rotating around a first (following) shaft 1104 coupled to the motor, a driven blade 1106 is coupled to a driven rotor rotating about a second (driven) shaft 1108 concentric with the following shaft 1104. The two independent concentric shafts 1104, 1108 are linked with a cam follower 1110 adapted to move in a set of nested channels 1112 including a profiled cam channel 1116 provided around a vertical cam channel 1114.

The following (e.g., inner) shaft 1104 may include the vertical cam channel 1114. The driven (e.g., outer) shaft 1108 may include the profiled cam channel 1116 that runs at an angle (e.g., 90 degrees) around the circumference of the driven shaft 1108. The cam follower 1110 is tied to a pushrod 1118 that is provided within the following shaft 1104 and the driven shaft 1108. When the pushrod 1118 is actuated vertically, the pushrod 1118 forces the following shaft 1104 and the driven shaft 1108 (as well as the corresponding rotors) to travel 90 degrees between the stowed position of the pushrod-and-cam scissor mechanism 1100 shown in FIG. 1B and the deployed position of the pushrod-and-cam scissor mechanism 1100 shown in FIG. 1C.

Figure 11A:
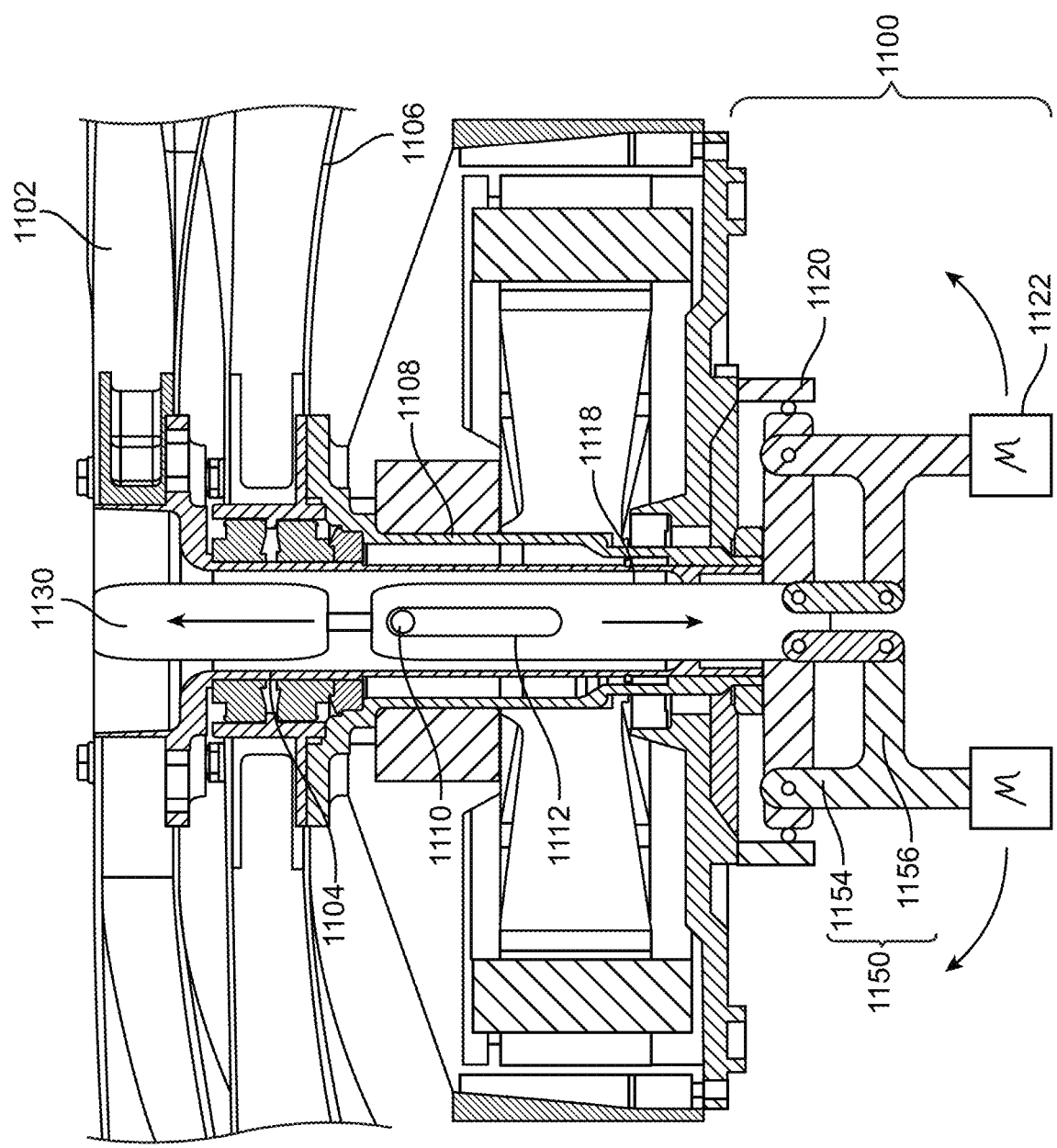
FIG. 11A illustrates components of an exemplary pushrod-and-cam scissoring mechanism, according to various embodiments.
Figure 11B:
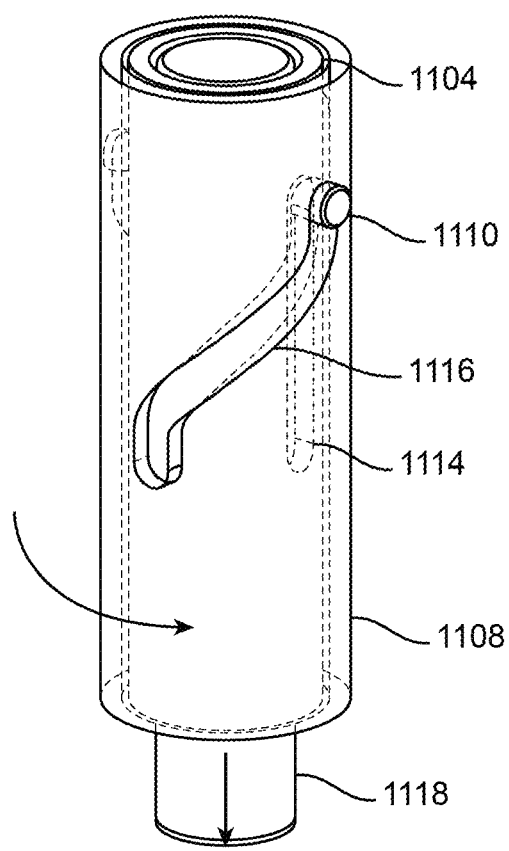
FIG. 11B illustrates the exemplary pushrod-and-cam scissoring mechanism of FIG. 11A in a stowed position, according to various embodiments.
Figure 11C:
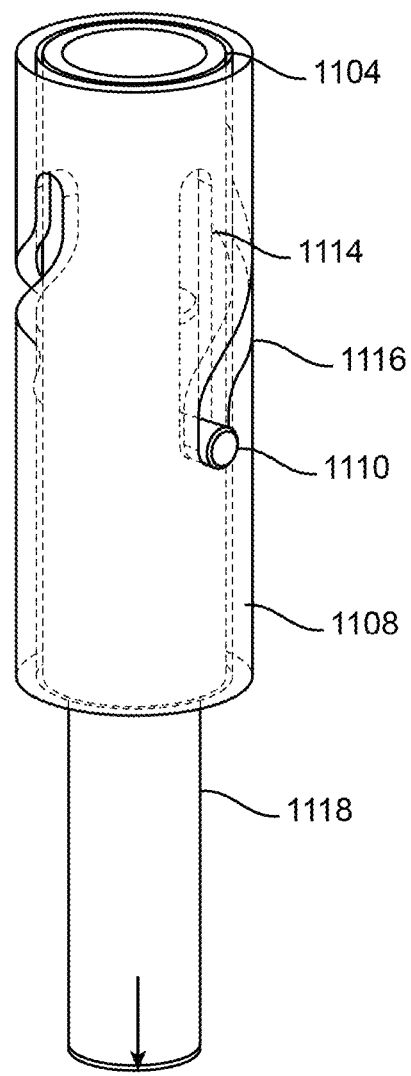
FIG. 11C illustrates the exemplary pushrod-and-cam scissoring mechanism of FIG. 11A in a deployed position, according to various embodiments.

According to various embodiments, the pushrod 1118 may be actuated and/or controlled by a set of spinning masses 1122 that apply an increasing downward force as the motor rpm increases. As the motor rpm passes a threshold rpm (e.g., 300-500 rpm), the masses 1122 move out radially and force the pushrod 1118 downward in the vertical direction, camming the shafts 1104, 1108, and deploying the rotors (and therefore the blades 1102, 1106) coupled to the shafts 1104, 1108. That is, as the motor rpm increases, the centrifugal force pulls the masses 1122 radially out, drawing the pushrod 1118 downward on the vertical direction. The movement of the pushrod 1118 activates the cam follower 1110 to move in the nested cam channels 1112 (e.g., the profiled cam channel 1116 and the vertical cam channel 1114) that allows for the 90 degree scissoring movement. During the operation of the driven rotor (and hence the following rotor), the centrifugal force forces the cam follower 1110 to remain at the bottom of the nested cam channels 1112 in the deployed position, as shown in FIG. 11C.

In some embodiments, the pushrod-and-cam scissor mechanism 1100 may include a retracting mechanism 1130 (e.g., a spring, a damped gas spring, or a conventional spring) that is configured to return the pushrod-and-cam scissor mechanism 1100 to the stowed position once the motor rpm has dropped below the threshold rpm. The retracting mechanism 1130 may apply a retracting force on the pushrod 1118 to bring the pushrod 1118 upward in the vertical direction to the resting position, as shown in FIG. 11B, once the moor rpm has dropped below the threshold rpm. When the pushrod 1118 is at the resting position, the cam follower 1110 is at the top of the nested cam channels 1112 in the stowed position, as shown in FIG. 11B. If the retracting mechanism 1130 fails, the pushrod-and-cam scissor mechanism 1100 remains in the deployed position (shown in FIG. 11C), which is an advantageous fail position for the aircraft since such fail position causes the blades to remain in the deployed state.

According to various embodiments, the pushrod-and-cam scissor mechanism 1100 may include a damper that is mounted coaxially with the shafts 1104, 1108. The damper may be configured to keep the relative speeds of the rotors at a predetermined level (e.g., low speed) to prevent high impact forces at the ends of travel of the pushrod-and-cam scissor mechanism 1100 mechanism. In some embodiments, the damper may be coupled to the retracting mechanism 1130.

Figure 11D:
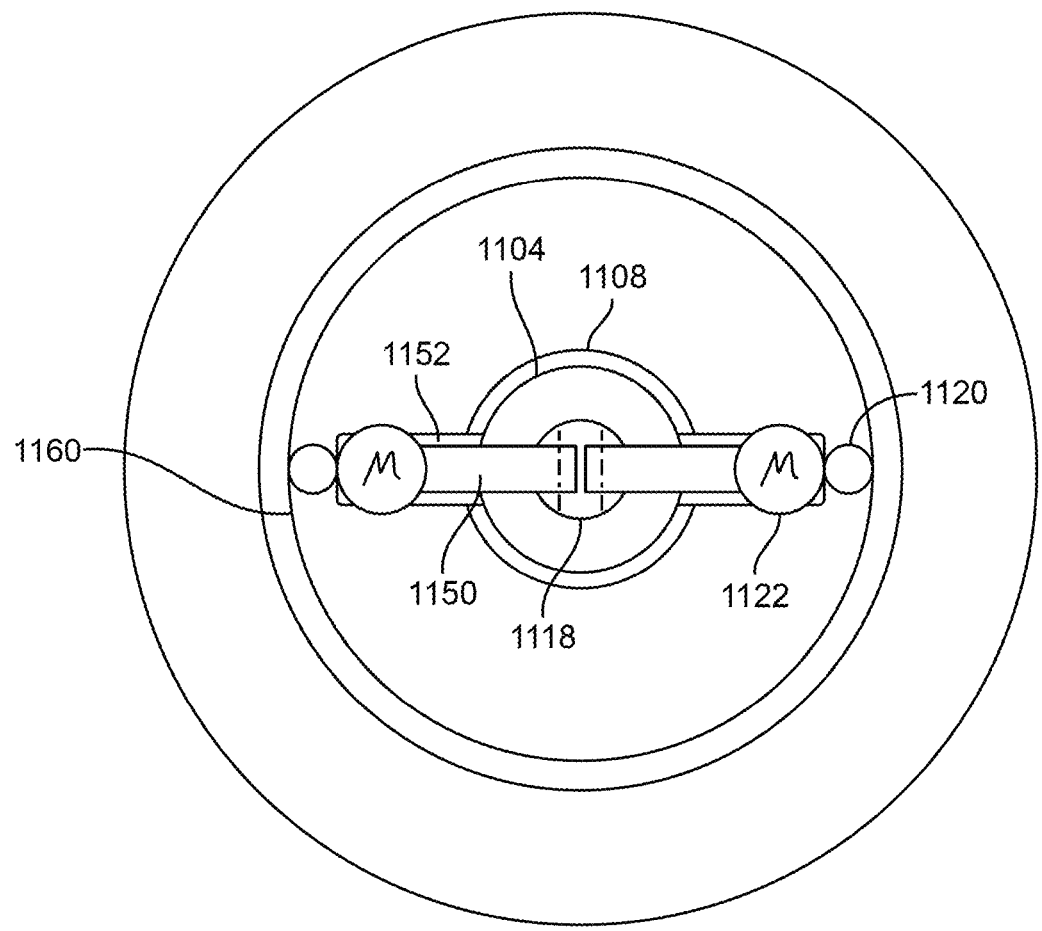
FIG. 11D illustrates a bottom view of the exemplary pushrod-and-cam scissoring mechanism of FIG. 11A, according to various embodiments.

FIG. 11D illustrates a bottom view of the pushrod-and-cam scissor mechanism 1100 according to various embodiments. In some embodiments, the masses 1122 may be coupled to a lower (e.g., bottom) end of the pushrod 1118 via a coupling mechanism 1150. The coupling mechanism 1150 may include one or more joints and beams that couple the pushrod 1118 to a pair of beams 1152 that extend outward from a bottom of the following shaft 1104. The pair of beams 1152 rotate along with the following shaft 1104. The coupling mechanism 1150 may include a first portion 1154 that extends perpendicular to the pair of beams 1152 when the masses 1122 are in the stowed position, and a second portion 1156 that extends parallel to the pair of beams 1152 when the masses are in the stowed position. When the centrifugal force pulls the masses 1122 radially out, the pair of beams 1152 rotate around a fixed pivot point on the following shaft 1104. This motion results in a linear motion that pulls down on pushrod 1118. In a fully deployed state, the masses 1122 remain within a shadow (e.g., footprint) of the motor. The geometry of the coupling mechanism 1150 (e.g., the linkages between the joints and the beams) may be configured to control the range of motion of the coupling mechanism 1150 such that the masses 1122 remain within the shadow (e.g., footprint) of the motor.

In some embodiments, the pushrod-and-cam scissor mechanism 1100 mechanism may include a position locking mechanism configured to hold the rotors in the low drag orientation in the stowed configuration. The position locking mechanism may include one or more latch pawls 1120 provided at a distal end of the pair of beams 1152, between the pair of beams 1152 and a circular stop 1160 provided around the pushrod-and-cam scissor mechanism 1100. The position locking mechanism includes one or more latch pawls, that are held radially inward toward the center of rotation by springs and/or magnets, and engage the circular stop 1160 (e.g., detent). Once the rotors begin to spin, the latch pawls are pulled from the stop 1160 and then as the rpm is increased, the latch pawls are held out radially by centrifugal force. Once the rpm drops back down below the threshold rpm, the latch pawls are pulled back in by the springs and/or magnets and re-engage the stop 1160.

According to various embodiments, the coupling mechanism 1150 may include a hydraulic mechanism that is activated based on a hydraulic pressure generated due to increasing rpm. The hydraulic pressure may activate a hydraulic piston cylinder that drives the pushrod 1118 down, creating a linear force profile. The pushrod-and-cam scissor mechanism 1100 may deploy faster than the other exemplary scissoring mechanisms described herein. While the other exemplary scissoring mechanisms may initiate a set of commands and responses that ensure that the rotor is deployed correctly, the pushrod-and-cam scissor mechanism 1100 may be able to deploy a torque as soon as the rotor reaches the threshold rpm.

Harmonic Drive Enabled Scissor Mechanism

Figure 12:
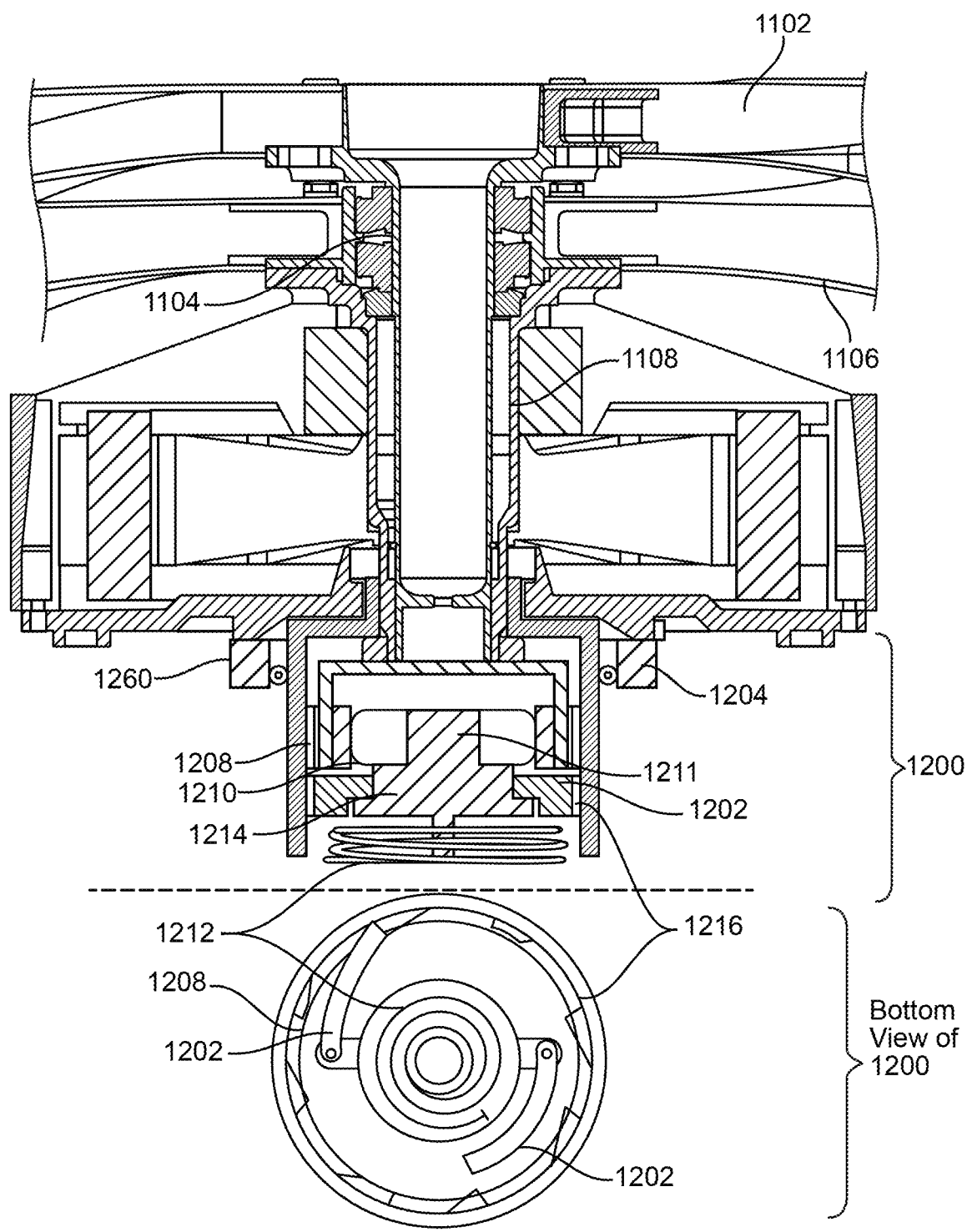
FIG. 12 illustrates an exemplary harmonic drive enabled scissoring mechanism, according to various embodiments.

FIG. 12 illustrates an exemplary harmonic drive enabled scissor mechanism 1200 according to various embodiments. A following blade 1102 is coupled to a following rotor rotating around a first (following) shaft 1104 coupled to the motor, a driven blade 1106 is coupled to a driven rotor rotating about a second (driven) shaft 1108 concentric with the first shaft 1104. The two independent concentric shafts 1104, 1108 are linked with a harmonic drive including a circular spline 1208, a flex spline 1206 nested in the circular spline 1208, and a wave generator 1210 nested in the flex spline 1206. According to various embodiments, the wave generator 1210 may have an oval shaped varying profile.

The wave generator 1210 is provided around a shaft 1211 that rotates and drives the wave generator 1210 within the flex spline 1206, for example, at a rate of two teeth 1216 per revolution relative motion between the flex spline 1206 and the circular spline 1208. The circular spline 1208 is attached to the driven shaft 1108 and the flex spline 1206 is attached to the following shaft 1104. The circular spline 1208 and the flex spline 1206 are engaged with one another. The relative angular movement between the circular spline 1208 and the flex spline 1206 is achieved by rotating the wave generator 1210. Accordingly, at all times the driven shaft 1108 and the following shaft 1104 are rigidly connected by the spline interface (e.g., the driven shaft 1108 and the following shaft 1104 are never disengaged).

When the driven shaft 1108 starts rotating, the wave generator 1210 is activated. The wave generator 1210 is coupled to a mass 1214 that gives the wave generator 1210 a predetermined inertia sufficient enough to activate the circular spline 1208 and the flex spline 1206. The wave generator 1210 is further coupled to a latch mechanism including a set of ratchet pawls 1202 and a constant force torsion spring 1212. The latch mechanism, with spring-loaded ratchet pawls 1202, engages the ratchet teeth 1216 provided on an inner surface of the circular spline 1208 when the rpm is above the threshold rpm (e.g., about 300-500 rpm), and ensures that the wave generator 1210 only rotates in one direction (e.g., the direction that advances the following blade 1102 toward the deployed position). The constant force torsion spring 1212 may be preloaded and sprung to drive the wave generator 1210 in the opposite direction (e.g., the direction that moves the rotors back to the stowed position).

During the deploying stage, the motor spins up the rotating assembly (the driven shaft 1108, the driven blades 1106 and the circular spline 1208 coupled to the driven shaft 1108). The wave generator 1210 (and mass 1214) lags behind due to the inertia caused by the mass 1214. This produces the required relative rotation of the wave generator 1210, that in turn advances the drive and causes the following blades 1102 to deploy (e.g., the lagging behind generates the relative angular displacement that is required to drive the wave generator 1210). The ratchet pawls 1202 deploy outward and engage the teeth 1216, ensuring that the torsion spring 1212 does not drive the wave generator 1210 back to the stowed position. Accordingly, the latch mechanism including the ratchet pawls 1202 and the teeth 1216 keep the following blade and the driven blade in the deployed configuration, wherein engaging the latch mechanism locks the following blade at the predetermined angle with respect to the driven blade in the deployed configuration allowing the following blade and the driven blade to rotate together.

During the stowing stage, the motor rpm is dropped below the threshold rpm of the ratchet pawls 1202 and a positive torque pulse is applied to release the ratchet pawls 1202 from the ratchet teeth 1216. Once the ratchet pawls 1202 are released, the torsion spring 1212 drives the wave generator 1210 and the rotors are returned to the stowed position. According to various embodiments, the motor/rotor assembly may include one or more travel stops that limit the relative rotation of the rotors between the 0 and 90 degrees.

In some embodiments, the harmonic drive enabled scissor mechanism 1200 may include a position locking mechanism configured to hold the rotors in the low drag orientation in the stowed configuration. The position locking mechanism may include one or more latch pawls 1204 provided at a proximal end of the circular spline 1208 closer to a bottom surface of the motor assembly. The latch pawls 1204 may remain between the circular spline 1208 and a circular stop 1260 provided around the harmonic drive enabled scissor mechanism 1200.

In some embodiments, the harmonic drive may be replaced with a centrifugal force activated sprag clutch that locks the flex spline 1206 and the circular spline 1208 when rolled in the opposite direction.

Embodiments provide various scissoring mechanisms that move the rotors (and blades) of a vertical lift fan between a stowed configuration and the deployed configuration. The scissoring mechanisms include (1) a positioning mechanism to keep the following blade and the driven blade in the stowed configuration, and (2) a latch mechanism to keep the set of following blades and the set of driven blades in the deployed configuration. Specifically, the scissoring mechanisms described herein are configured to be deploy the blades from a stowed configuration to a deployed configuration while the motor is operating at near-zero speed (e.g., less than or equal to about 5 rpm, or not to exceed 5 rpm) or at zero speed.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A system comprising:
   a motor,
   a driven blade coupled to a driven rotor rotating around a first shaft coupled to the motor,
   a following blade coupled to a following rotor rotating around a second shaft concentric with the first shaft, and
   a scissoring mechanism configured to move the following blade and the driven blade between a stowed configuration and a deployed configuration, the scissoring mechanism comprising:
      a positioning mechanism configured to keep the following blade and the driven blade in the stowed configuration, wherein disengaging the positioning mechanism moves the driven blade to a predetermined angle with respect to the following blade in the deployed configuration while the motor is operating at zero or near-zero speed;
      a latch mechanism configured to keep the following blade and the driven blade in the deployed configuration, wherein engaging the latch mechanism locks the following blade at the predetermined angle with respect to the driven blade in the deployed configuration allowing the following blade and the driven blade to rotate together; and
      a latch ring that is fixed to the second shaft, a following ring that is fixed to the following rotor, and a driven ring fixed to the first shaft, wherein the latch ring, the driven ring and the following ring are stacked around the second shaft,
      wherein the positioning mechanism includes a driven pawl coupled to the driven ring and a following detent formed on the following ring, wherein the driven pawl is released from a closed configuration when the motor starts operating at near-zero speed and engages the following detent, and
      wherein the latch mechanism includes a following pawl provided on the following ring, and a driven detent formed on the driven ring, wherein in the deployed configuration, at least a portion of the following pawl is caught in the driven detent.

2. The system of claim 1, wherein the scissoring mechanism, the following blade, and the driven blade are stacked on a first side of the motor.

3. The system of claim 1, wherein the near-zero speed is less than or equal to about 5 rpm.

4. The system of claim 1, comprising a lift fan including the motor, the driven blade, the following blade, and the scissoring mechanism.

5. An aircraft comprising one or more of lift fans each including the system of claim 1.

6. The system of claim 1, wherein the latch ring has a smaller diameter than a diameter of the following ring or a diameter of the driven ring.

7. The system of claim 1, wherein the following ring comprises a bottom ring and a top ring that form an enclosure in an assembled state of the scissoring mechanism.

8. The system of claim 1, further comprising a magnet coupled to the driven pawl or the following pawl.

9. The system of claim 1, wherein the following pawl is spring-loaded.

10. The system of claim 1, wherein during a deployment sequence transitioning from the closed configuration to the deployed configuration, the following blade remains static and the driven blade moves away from the following blade.

11. The system of claim 1, wherein during a deployment sequence transitioning from the closed configuration to the deployed configuration, the driven blade moves in a first direction until the driven blade reaches the predetermined angle with respect to the following blade.

12. The system of claim 11, wherein in the deployed configuration, the driven blade and the following blade move together in the first direction.

13. The system of claim 11, wherein during a stow sequence transitioning from the deployed configuration to the closed configuration, the driven blade and the following blade move together in a second direction opposite to the first direction until the following blade is locked in the closed configuration.

14. The system of claim 13, wherein during the stow sequence, after the following blade is locked in the closed configuration, the driven ring is servoed in the second direction opposite to the first direction about 180 degrees until the driven blade is locked in the closed configuration.

15. The system of claim 1, further comprising one or more dampers configured to limit a speed between the driven ring and the following ring.

16. The system of claim 1, further comprising a negative ramp angle on the driven detent.

17. The system of claim 1, wherein in case of a system failure, the driven blade and the following blade remain locked in the deployed configuration.

18. A lift fan comprising:
    a motor,
    a driven blade coupled to a driven rotor rotating around a first shaft coupled to the motor,
    a following blade coupled to a following rotor rotating around a second shaft concentric with the first shaft, and
    a scissoring mechanism configured to move the following blade and the driven blade between a stowed configuration and a deployed configuration, wherein the following blade and the driven blade are stacked on top each other in a low drag position in the stowed configuration, wherein the driven blade is at a predetermined angle to the following blade in the deployed configuration, the scissoring mechanism comprising:
- a positioning mechanism configured to keep the following blade and the driven blade in the stowed configuration, wherein disengaging the positioning mechanism moves the driven blade to a predetermined angle with respect to the following blade in the deployed configuration while the motor is operating at about 5 rpm or less; and
- a latch mechanism configured to keep the following blade and the driven blade in the deployed configuration, wherein engaging the latch mechanism locks the following blade at the predetermined angle with respect to the driven blade in the deployed configuration allowing the following blade and the driven blade to rotate together; and
- a latch ring that is fixed to the second shaft, a following ring that is fixed to the following rotor, and a driven ring fixed to the first shaft, wherein the latch ring, the driven ring and the following ring are stacked around the second shaft,
- wherein the positioning mechanism includes a driven pawl coupled to the driven ring and a following detent formed on the following ring, wherein the driven pawl is released from a closed configuration when the motor starts operating at near-zero speed and engages the following detent, and
- wherein the latch mechanism includes a following pawl provided on the following ring, and a driven detent formed on the driven ring, wherein in the deployed configuration, at least a portion of the following pawl is caught in the driven detent.

19. A lift fan comprising:
a motor,
a driven blade coupled to a driven rotor rotating around a first shaft coupled to the motor,
a following blade coupled to a following rotor rotating around a second shaft concentric with the first shaft, and
a scissoring mechanism configured to move the following blade and the driven blade between a stowed configuration and a deployed configuration,
the scissoring mechanism comprising:
- a latch ring that is fixed to the second shaft, a following ring that is fixed to the following rotor, and a driven ring fixed to the first shaft, wherein the latch ring, the driven ring and the following ring are stacked around the second shaft,
- wherein a driven pawl coupled to the driven ring is released from a closed configuration when the motor starts operating at near-zero speed and engages a following detent, and
- wherein in the deployed configuration, at least a portion of a following pawl provided on the following ring is caught in a driven detent formed on the driven ring.

20. An aircraft comprising one or more of lift fans according to claim 19.

* * * * *